US012608650B2

(12) United States Patent
Maruo et al.

(10) Patent No.: US 12,608,650 B2
(45) Date of Patent: Apr. 21, 2026

(54) STORAGE MEDIUM, INFORMATION PROCESSING METHOD, AND INFORMATION PROCESSING APPARATUS

(71) Applicant: Fujitsu Limited, Kawasaki (JP)

(72) Inventors: Akito Maruo, Atsugi (JP); Kenji Homma, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 763 days.

(21) Appl. No.: 17/966,892

(22) Filed: Oct. 17, 2022

(65) Prior Publication Data

US 2023/0229962 A1     Jul. 20, 2023

(30) Foreign Application Priority Data

Jan. 18, 2022     (JP) ................................. 2022-005997

(51) Int. Cl.
*G16C 20/10*          (2019.01)
*G06N 20/00*          (2019.01)
(52) U.S. Cl.
CPC .................................. *G06N 20/00* (2019.01)
(58) Field of Classification Search
CPC ......... G16C 20/10; G16C 20/70; G16C 60/00
See application file for complete search history.

(56) References Cited

U.S. PATENT DOCUMENTS

2020/0364594 A1*  11/2020  Liu .......................... G06F 30/23

FOREIGN PATENT DOCUMENTS

JP          2003-88750  A      3/2003
JP          2020-30638  A      2/2020

OTHER PUBLICATIONS

Homma Kenji et al: "Optimization of a Heterogeneous Ternary Li3PO4—Li3BO3—Li2SO4 Mixture for Li-Ion Conductivity by Machine Learning", The Journal of Physical Chemistry C, vol. 124, No. 24, May 20, 2020 (May 20, 2020), pp. 12865-12870, XP093048142, US ISSN: 1932-7447, DOI: 10.1021 /acs.jpcc.9b11654 Retrieved from the Internet: U RL:http://pubs.acs.org/doi/pdf/10.1021 /acs. jpcc.9b11654.
Yan Gang et al: "Influence of sintering temperature on conductivity and mechanical behavior of the solid electrolyte Latp", Ceramics International, vol. 45, No. 12 , pp. 14697-14703, XP085707554, ISSN: 0272-8842, DOI: 10.1016/J.CERAMINT.2019.04.191.
Extended European Search Report issued Jun. 1, 2023, in corresponding European Patent Application No. 22201065.4, 8pp.

* cited by examiner

*Primary Examiner* — Grace Park
(74) *Attorney, Agent, or Firm* — XSENSUS LLP

(57)          ABSTRACT
A storage medium storing a program that causes a computer to execute a process that includes acquiring a first model that is trained based on training data which indicates a first combination of constituent values of a target object and an environmental value in an experiment on the target object with associating with a characteristic value and that specifies a mean value and a deviation value of the characteristic value; acquiring a second model that is trained based on training data which indicates a second combination of the constituent values and an allowable condition for the experiment, and that specifies the allowable condition; and generating a solution set for the first combination by performing multi-objective optimization by a penalty term based on the allowable condition, a first objective function, and a second objective function.

19 Claims, 17 Drawing Sheets

CONDUCTIVITY $[\times 10^6 \text{ S/cm}]$    PROCESS CONDITION    COMPOSITION RATIO 600-1

| No. | conductivity | P1 | Li3BO3 | Li3PO4 | Li2SO4 |
|---|---|---|---|---|---|
| 1 | 0 | 1000 | 0 | 100 | 0 |
| 2 | 33 | 1000 | 0 | 75 | 25 |
| 3 | 17 | 700 | 25 | 75 | 0 |
| 4 | 99 | 1000 | 0 | 50 | 50 |
| 5 | 97 | 620 | 25 | 50 | 25 |
| 6 | 56 | 620 | 50 | 50 | 0 |
| 7 | 163 | 900 | 0 | 25 | 75 |
| 8 | 144 | 620 | 25 | 25 | 50 |
| 9 | 83 | 620 | 50 | 25 | 25 |
| 10 | 120 | 650 | 75 | 25 | 0 |
| 11 | 0 | 700 | 0 | 0 | 100 |
| 12 | 49 | 650 | 25 | 0 | 75 |
| 13 | 23 | 620 | 50 | 0 | 50 |
| 14 | 23 | 650 | 75 | 0 | 25 |
| 15 | 9 | 700 | 100 | 0 | 0 |

|        | MELT POINT  | COMPOSITION RATIO | | |
|--------|-------------|--------|--------|--------|
| No.    | melt point  | Li3BO3 | Li3PO4 | Li2SO4 |
| 0-1    | 1200        | 0      | 100    | 0      |
| 0-2    | 1150        | 0      | 75     | 25     |
| 0-3    | 775         | 25     | 75     | 0      |
| 0-4    | 1100        | 0      | 50     | 50     |
| 0-5    | 900         | 25     | 50     | 25     |
| 0-6    | 776         | 50     | 50     | 0      |
| 0-7    | 830         | 0      | 25     | 75     |
| 0-8    | 650         | 25     | 25     | 50     |
| 0-9    | 674         | 50     | 25     | 25     |
| 0-10   | 778         | 75     | 25     | 0      |
| 0-11   | 865         | 0      | 0      | 100    |
| 0-12   | 748         | 25     | 0      | 75     |
| 0-13   | 642         | 50     | 0      | 50     |
| 0-14   | 720         | 75     | 0      | 25     |
| 0-15   | 801         | 100    | 0      | 0      |

700-1

1200

| P1 | Li3BO3 | Li3PO4 | Li2SO4 |
|-----|--------|--------|--------|
| 824 | 8 | 33 | 59 |

Figure 14:
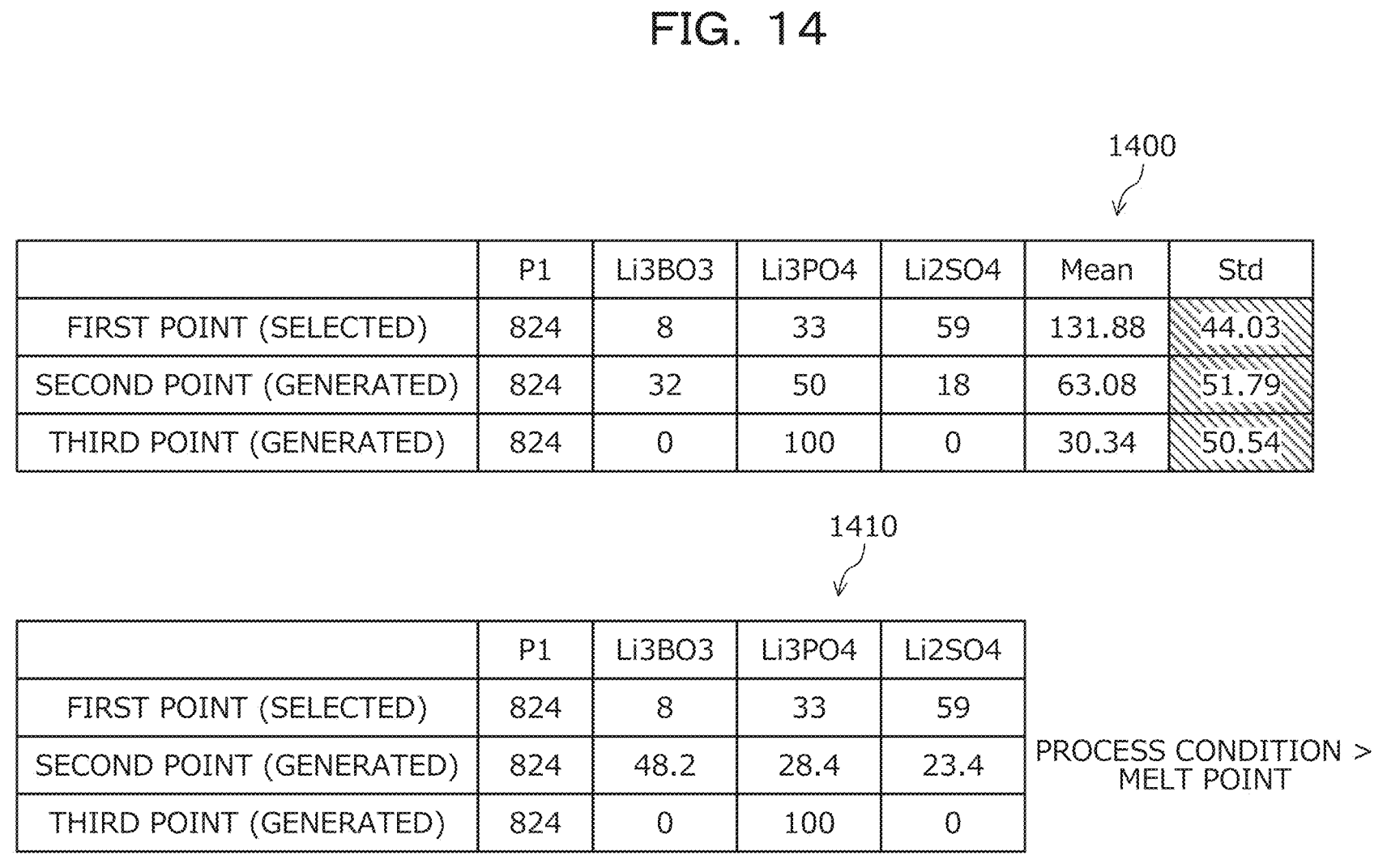

| | P1 | Li3BO3 | Li3PO4 | Li2SO4 | Mean | Std |
|---|---|---|---|---|---|---|
| FIRST POINT (SELECTED) | 824 | 8 | 33 | 59 | 131.88 | 44.03 |
| SECOND POINT (GENERATED) | 824 | 32 | 50 | 18 | 63.08 | 51.79 |
| THIRD POINT (GENERATED) | 824 | 0 | 100 | 0 | 30.34 | 50.54 |

1410

| | P1 | Li3BO3 | Li3PO4 | Li2SO4 | PROCESS CONDITION > MELT POINT |
|---|---|---|---|---|---|
| FIRST POINT (SELECTED) | 824 | 8 | 33 | 59 | |
| SECOND POINT (GENERATED) | 824 | 48.2 | 28.4 | 23.4 | |
| THIRD POINT (GENERATED) | 824 | 0 | 100 | 0 | |

FIG. 16

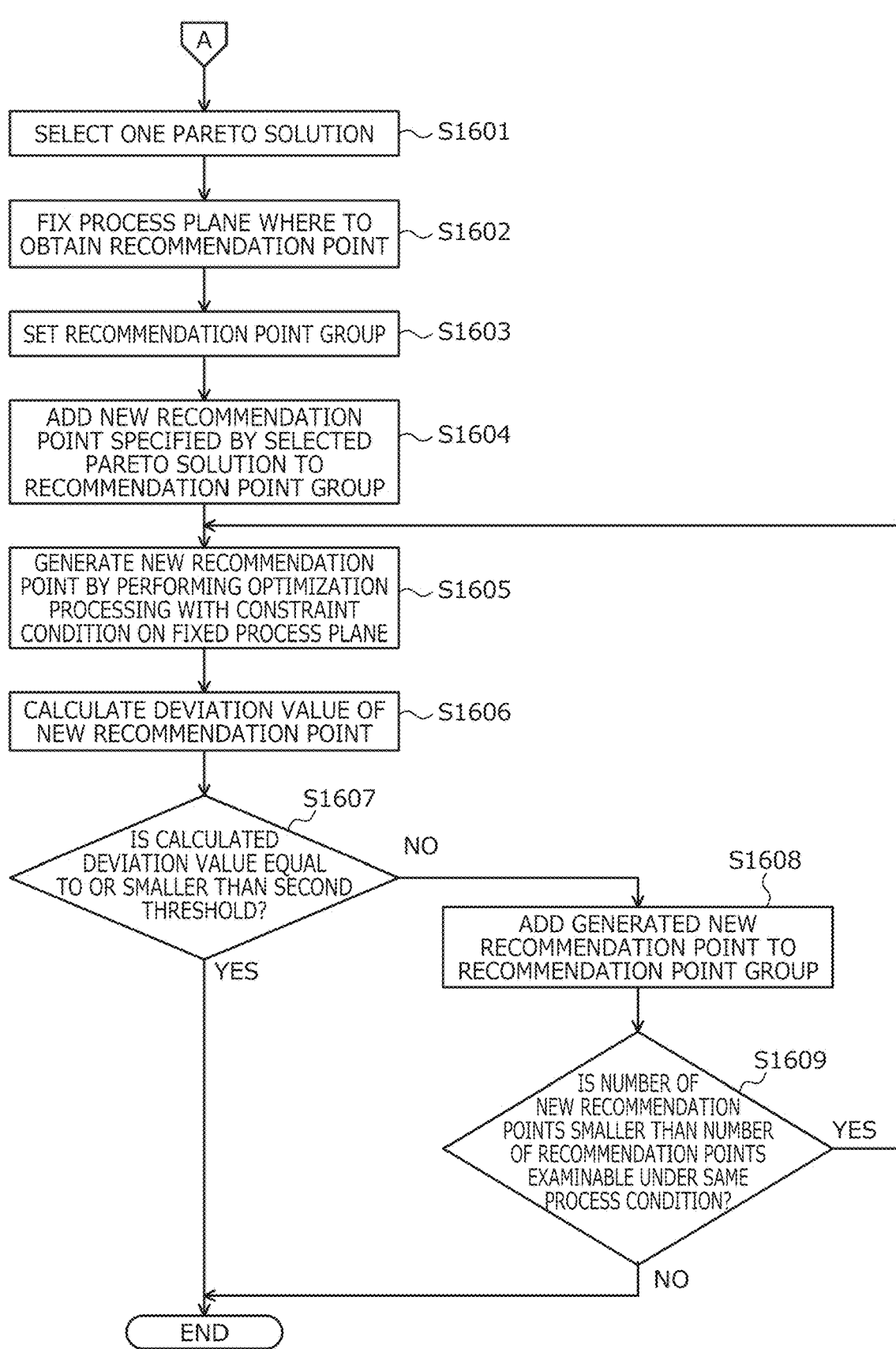

A

SELECT ONE PARETO SOLUTION — S1601

FIX PROCESS PLANE WHERE TO OBTAIN RECOMMENDATION POINT — S1602

SET RECOMMENDATION POINT GROUP — S1603

ADD NEW RECOMMENDATION POINT SPECIFIED BY SELECTED PARETO SOLUTION TO RECOMMENDATION POINT GROUP — S1604

GENERATE NEW RECOMMENDATION POINT BY PERFORMING OPTIMIZATION PROCESSING WITH CONSTRAINT CONDITION ON FIXED PROCESS PLANE — S1605

CALCULATE DEVIATION VALUE OF NEW RECOMMENDATION POINT — S1606

S1607 IS CALCULATED DEVIATION VALUE EQUAL TO OR SMALLER THAN SECOND THRESHOLD?

NO

S1608 ADD GENERATED NEW RECOMMENDATION POINT TO RECOMMENDATION POINT GROUP

YES

S1609 IS NUMBER OF NEW RECOMMENDATION POINTS SMALLER THAN NUMBER OF RECOMMENDATION POINTS EXAMINABLE UNDER SAME PROCESS CONDITION?

YES

NO

END

STORAGE MEDIUM, INFORMATION PROCESSING METHOD, AND INFORMATION PROCESSING APPARATUS

CROSS-REFERENCE TO RELATED APPLICATION

This application is based upon and claims the benefit of priority of the prior Japanese Patent Application No. 2022-5997, filed on Jan. 18, 2022, the entire contents of which are incorporated herein by reference.

FIELD

The embodiments discussed herein are related to a storage medium, an information processing method, and an information processing apparatus.

BACKGROUND

Heretofore, multiple composition ratios of mixtures are set as experimental values, and an appropriate composition ratio is searched out by experimenting syntheses of mixtures according to the respective composition ratios. Meanwhile, there is a method called Bayesian optimization for improving search efficiency by calculating, based on existing composition ratios, a new composition ratio candidate which is considered preferable for an experiment of synthesis of a mixture.

As the related art, for example, there is a technique in which a substrate coated with a plurality of sample solutions is heated to synthesize a plurality of inorganic materials on the substrate. For example, there is a technique in which synthesis probabilities of pseudo composition formulae are assigned to the pseudo composition formulae as teacher labels and an estimation model for estimating a synthesis probability is generated by training the pseudo composition formulae assigned with the teacher labels.

Japanese Laid-open Patent Publication Nos. 2003-88750 and 2020-30638 are disclosed as related art.

SUMMARY

According to an aspect of the embodiments, a non-transitory computer-readable storage medium storing an information processing program that causes at least one computer to execute a process, the process includes acquiring a first model that is trained based on a first training data group which contains training data pieces each of which indicates a first combination of constituent values of a target object and a first environmental value in an experiment on the target object with associating with a characteristic value of the target object, and that specifies a mean value of the characteristic value of the target object and a deviation value of the characteristic value according to the first combination; acquiring a second model that is trained based on a second training data group which contains training data pieces each of which indicates a second combination of the constituent values and an allowable condition for the experiment, and that specifies the allowable condition for the experiment according to the constituent values; and generating a solution set for the first combination by performing multi-objective optimization by use of a penalty term based on the allowable condition identified with the acquired second model, a first objective function for use to search for a value of a first objective variable based on the mean value identified with the acquired first model, and a second objective function for use to search for a value of a second objective variable based on the deviation value identified with the acquired first model.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 is an explanatory diagram illustrating an example of a first training data group;

FIG. 7 is an explanatory diagram illustrating an example of a second training data group;

FIG. 14 is an explanatory diagram illustrating an example of an effect produced by the information processing apparatus;

FIG. 16 is a flowchart illustrating the example of the overall processing procedure (part 2)

DESCRIPTION OF EMBODIMENTS

In the related art, there is a case where a calculated new composition ratio candidate does not satisfy an allowable condition for synthesis of a mixture. For example, if a mixture according to a calculated new composition ratio candidate has a melting point lower than a synthesis temperature that is an environmental value in an experiment, the mixture to be synthesized may be melted, and synthesis of the mixture may fail.

According to one aspect, an object of the present disclosure is to calculate effective experimental value candidates.

According to an embodiment, it is possible to calculate effective experimental value candidates.

Hereinafter, embodiments of an information processing program, an information processing method, and an information processing apparatus according to the present disclosure will be described in detail with reference to the drawings.

Example of Information Processing Method According to Embodiment

Figure 1:
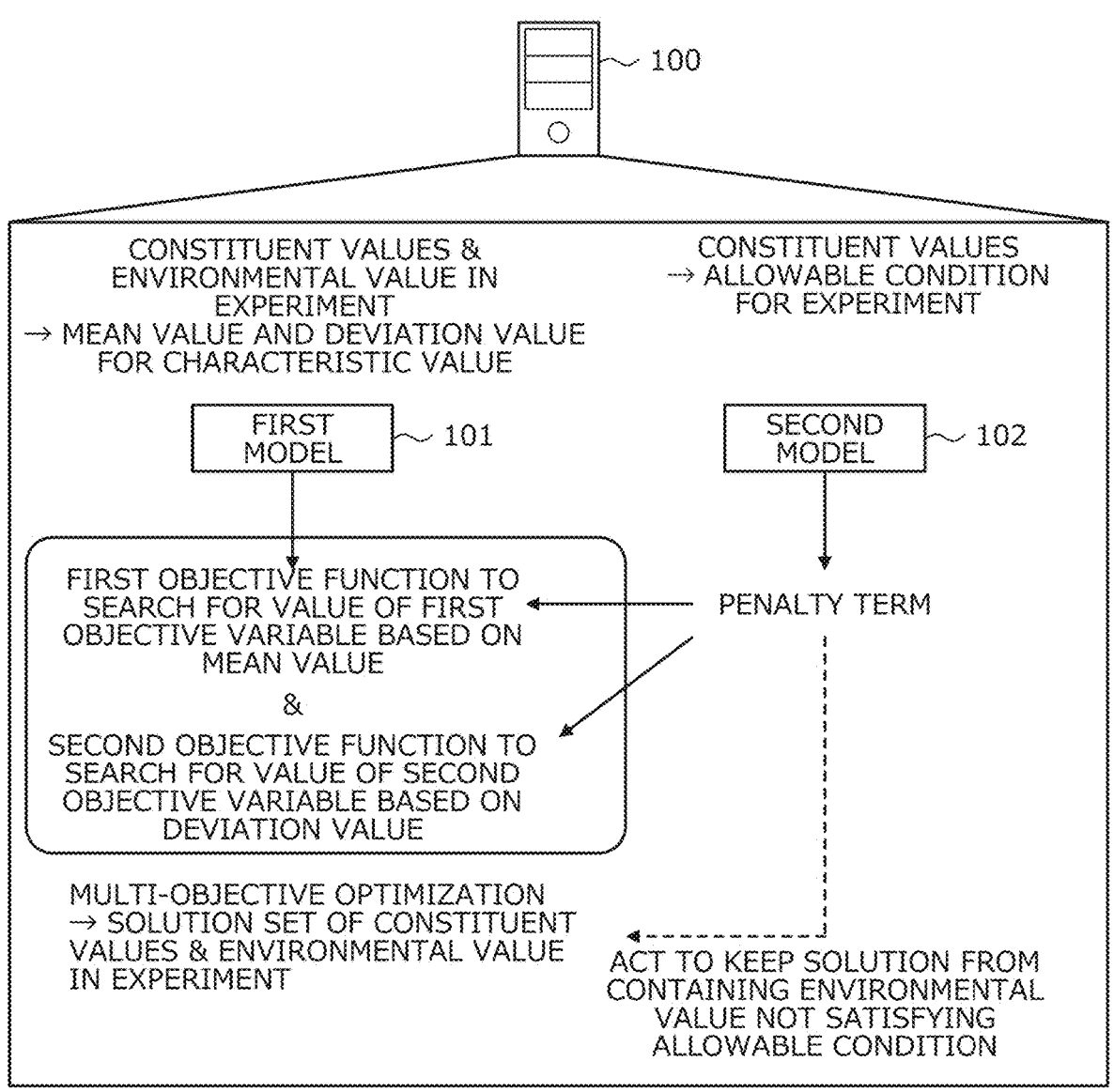
FIG. 1 is an explanatory diagram illustrating an example of an information processing method according to an embodiment.

FIG. 1 is an explanatory diagram illustrating an example of an information processing method according to an embodiment. An information processing apparatus 100 is a computer for calculating effective experimental value candidates for experiment on target objects.

The information processing apparatus 100 is, for example, a server, a personal computer (PC), or the like. For example, the target object is a mixture. For example, the target object is a mixture for use as a battery material. For example, the target object may be a semiconductor material or the like. For example, the semiconductor material is a substance composed of boron-added silicon or the like. For example, the target object may be an alloy or the like.

The mixture is, for example, a substance obtained by mixing two or more different materials. For example, the mixture may be a compound in which two or more different materials are mixed by a chemical reaction. For example, the mixture may be a substance in a state where two or more different materials are mixed without a chemical reaction.

An experiment is, for example, to synthesize a mixture. For example, the experiment may include checking a characteristic value of the synthesized mixture. For example, the synthesis is performed at a set synthesis temperature. The experimental value is, for example, a composition ratio of a mixture. For example, the experimental value may further contain an environmental value in the experiment or the like. The environmental value is, for example, a synthesis temperature.

A user may desire to know an appropriate experimental value suitable for a specific purpose. For example, the user may desire to know what experimental value to set so as to maximize the conductivity of a mixture for use as a battery material.

To this end, for example, the user experiments a synthesis of a mixture according to each of a plurality of experimental values to find out an appropriate experimental value. For example, the user synthesizes a mixture according to each of the plurality of experimental values, and inspects the conductivity of the synthesized mixture, thereby finding out an appropriate experimental value so as to maximize the conductivity of the mixture.

Meanwhile, there is a method called Bayesian optimization for improving search efficiency by calculating, based on existing experimental values, a new experimental value candidate that is considered preferable for an experiment of synthesis of a mixture. The experimental value contains, for example, a composition ratio of a mixture. For example, the experimental value may contain an environmental value in the experiment. In this method, for example, a new experimental value candidate is searched out from a region having a relatively small number of experimental values based on the variance of the existing experimental values.

However, in this method, a calculated new experimental value candidate may be an inappropriate experimental value candidate. For example, there is a case where a region having a relatively small number of experimental values is a region having experimental values that do not have to be examined. In this case, a calculated new experimental value candidate may be an inappropriate experimental value candidate. The experimental value that does not have to be examined is, for example, an experimental value leading to a failure of an experiment or the like.

For example, there is a case where a calculated new composition ratio candidate does not satisfy an allowable condition for synthesis of a mixture. The allowable condition is, for example, a condition that at least leads to a success of an experiment. For example, the allowable condition is that the melting point of the mixture is higher than a synthesis temperature, which is an environmental value in the experiment. For example, when the mixture according to the calculated new composition ratio candidate has a melting point lower than the synthesis temperature, which is the environmental value in the experiment, the allowable condition is not satisfied, so that the mixture to be synthesized may be melted and the synthesis of the mixture may fail.

This poses a problem of an increase in cost for an experiment. For example, the cost includes human cost, material cost, electricity cost, or time cost. Because the cost for a synthesis process tends to be higher than the cost for each of other processes in an experiment, a failure in the synthesis process is likely to lead to an increase in the cost.

In this method, only one new experimental value candidate is calculated. Meanwhile, some synthesizer facility for synthesis is capable of synthesizing N mixtures at the same time. In this case, the synthesizer facility has to run in order to synthesize a mixture according to only one experimental value candidate. For this reason, effective utilization of the synthesizer facility sometimes fails, which poses a problem of an increase in the cost for the experiment. For this reason, it is desirable to calculate a plurality of new experimental value candidates in some cases.

To address this, in the present embodiment, description will be given of an information processing method capable of obtaining effective experimental value candidates by performing multi-objective optimization for obtaining an experimental value candidate by using a penalty term based on an allowable condition for an experiment on a target object.

In FIG. 1, the information processing apparatus 100 is used to perform an experiment on a target object. For example, the target object is a mixture. For example, the target object is defined by constituent values. The constituent values are, for example, a composition ratio of materials for forming a mixture.

An experiment on a target object includes, for example, a process of generating the target object. For example, the experiment on the target object includes a process of generating a mixture by heating. For example, the experiment on the target object may further include a process of inspecting a characteristic value of the target object. For example, the characteristic value is the conductivity or the like of the mixture. For example, the experiment on the target object is performed in accordance with a set environmental value. For example, the environmental value is a heating temperature. For example, a combination of the constituent values and the environmental value constitutes an experimental value.

(1-1) The information processing apparatus 100 acquires a first model 101. For example, the first model 101 is a model that enables a mean value and a deviation value regarding a characteristic value of a target object to be identified according to a combination of the constituent values of the target object and an environmental value in an experiment on the target object. For example, the first model 101 is trained based on a first training data group. For example, the first training data group contains training data pieces each specifying a characteristic value of the target object in association with a combination of the constituent values of a target object and the environmental value in the experiment on the target object. For example, the first model 101 is a Gaussian process regression model. For example, the information processing apparatus 100 acquires the first model 101 by training the first model 101 based on the first training data group.

(1-2) The information processing apparatus 100 acquires a second model 102. For example, the second model 102 is a model that enables an allowable condition for an experiment on a target object to be identified according to the constituent values of the target object. For example, the allowable condition is specified by the melting point of a mixture. For example, the allowable condition is that the melting point of the mixture is higher than a heating temperature serving as an environmental value in the experiment. For example, the second model 102 is trained based on a second training data group. For example, the second training data group contains training data pieces each specifying a combination of the constituent values of a target object and the allowable condition for the experiment on the target object according to the constituent values. For example, the information processing apparatus 100 acquires the second model 102 by training the second model 102 based on the second training data group.

(1-3) The information processing apparatus 100 sets a first objective function. For example, the first objective function is an objective function for searching for a value of a first objective variable based on the mean value identified with the acquired first model 101. For example, the value of the first objective variable is the mean value. The value of the first objective variable may be, for example, an upper limit value of a confidence interval based on the mean value. For example, the first objective function is an objective function for generating a solution for a combination of constituent values of a target object and an environmental value in an experiment on the target object so as to optimize the value of the objective function.

For example, the information processing apparatus 100 sets the first objective function containing a penalty term based on the allowable condition identified with the acquired second model 102. In the case where the allowable condition is not satisfied, the penalty term acts to degrade the value of the first objective variable as compared with the case where the allowable condition is satisfied. For example, the penalty term takes 0 when the melting point of the mixture is higher than the heating temperature serving as the environmental value in the experiment and the allowable condition is satisfied. For example, when the melting point of the mixture is equal to or lower than the heating temperature serving as the environmental value in the experiment and the allowable condition is not satisfied, the penalty term takes a value larger than 0.

(1-4) The information processing apparatus 100 sets a second objective function. For example, the second objective function is an objective function for searching for a value of a second objective variable based on the deviation value identified with the acquired first model 101. For example, the value of the second objective variable is the deviation value. For example, the second objective function is an objective function for generating a solution for a combination of constituent values of a target object and an environmental value in an experiment of the target object so as to optimize the value of the objective function.

For example, the information processing apparatus 100 sets the second objective function containing the penalty term based on the allowable condition identified with the acquired second model 102. In the case where the allowable condition is not satisfied, the penalty term acts to degrade the value of the second objective variable as compared with the case where the allowable condition is satisfied. For example, the penalty term takes 0 when the melting point of the mixture is higher than the heating temperature serving as the environmental value in the experiment and the allowable condition is satisfied. For example, when the melting point of the mixture is equal to or lower than the heating temperature serving as the environmental value in the experiment and the allowable condition is not satisfied, the penalty term takes a value larger than 0.

(1-5) The information processing apparatus 100 generates a solution set for a combination of constituent values of a target object and an environmental value in an experiment on the target object by performing multi-objective optimization using the first objective function and the second objective function. Each solution in the solution set corresponds to a new experimental value candidate.

After that, for example, the information processing apparatus 100 may select one solution in the generated solution set and output the selected solution in a manner referable by a user. For example, the output is display on the display. For example, the information processing apparatus 100 selects one solution that maximizes any one of the first objective variable and the second objective variable from the generated solution set, and outputs the selected solution in a manner referable by the user. For example, the information processing apparatus 100 may output all the solutions in the generated solution set in a manner referable by the user.

Thus, the information processing apparatus 100 is capable of keeping each of the solutions in the generated solution set from containing an environmental value that does not satisfy the allowable condition. Accordingly, the information processing apparatus 100 may enable the user to use solutions to serve as effective experimental value candidates. For example, the information processing apparatus 100 may enable the user to easily recognize a solution to serve as an effective experimental value candidate that is suited for a specific purpose. For example, the information processing apparatus 100 may enable the user to easily recognize what experimental value to set so as to maximize the conductivity of a mixture for use as a battery material.

In this way, the information processing apparatus 100 may keep the user from performing an experiment on a target object based on an experimental value that does not have to be examined. For example, the information processing apparatus 100 may keep the user from performing an experiment on a target object, which will result in a failure. The information processing apparatus 100 makes it possible to suppress an increase in the cost for the experiment.

The information processing apparatus 100 may make it easy to generate a plurality of new experimental value candidates based on the generated solution set. For example, the information processing apparatus 100 may enable the user to easily generate a plurality of new experimental value candidates. For example, there may be a case where the information processing apparatus 100 generates a plurality of new experimental value candidates based on one solution in the generated solution set. An example of this case will be described in detail later with reference to FIGS. 5 to 13.

Although the case where the information processing apparatus 100 acquires the first model 101 by training the first model 101 based on the first training data group has been described, embodiments are not limited thereto. For example, there may be a case where the information processing apparatus 100 acquires the first model 101 by receiving the first model 101 from another computer. For example, the other computer has a function of training the first model 101 based on the first training data group.

Although the case where the information processing apparatus 100 acquires the second model 102 by training the second model 102 based on the second training data group has been described, embodiments are not limited thereto. For example, there may be a case where the information processing apparatus 100 acquires the second model 102 by receiving the second model 102 from another computer. For example, the other computer has a function of training the second model 102 based on the second training data group.

Although the case where the information processing apparatus 100 operates alone has been described, embodiments are not limited thereto. For example, there may be a case where multiple computers cooperate with each other to implement the functions as the information processing apparatus 100. For example, a computer that trains the first model 101 and the second model 102, a computer that sets the first objective function and the second objective function, and a computer that performs the multi-objective optimization may cooperate with each other in some cases.

(Example of Information Processing System 200)

Next, an example of an information processing system 200 to which the information processing apparatus 100 illustrated in FIG. 1 is applied will be described by using FIG. 2.

Figure 2:
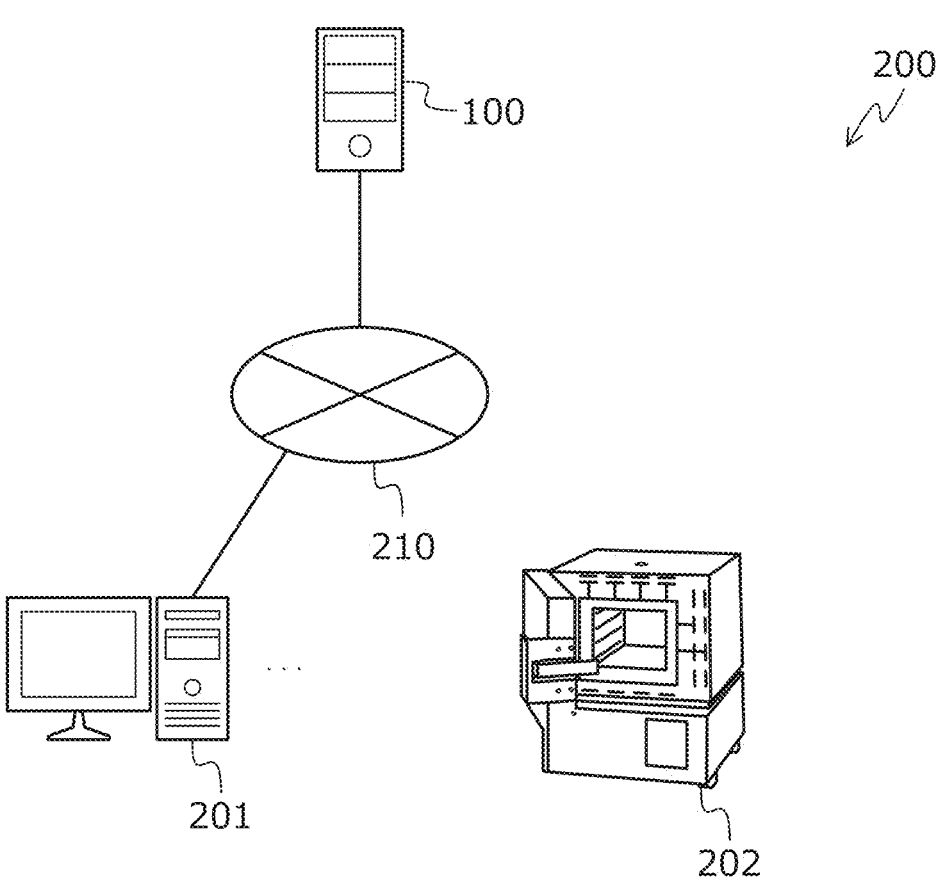
FIG. 2 is an explanatory diagram illustrating an example of an information processing system.

FIG. 2 is an explanatory diagram illustrating an example of the information processing system 200. In FIG. 2, the information processing system 200 includes the information processing apparatus 100, a client apparatus 201, and a synthesizer facility 202.

In the information processing system 200, the information processing apparatus 100, and the client apparatus 201 are coupled to each other via a wired or wireless network 210. The network 210 is, for example, a local area network (LAN), a wide area network (WAN), the Internet, or the like.

The information processing apparatus 100 is a computer used by an administrator. The information processing apparatus 100 stores a first model. For example, the first model is a model that enables a mean value and a deviation value regarding a characteristic value of a target object to be identified according to a combination of the constituent values of the target object and an environmental value in an experiment on the target object. For example, the information processing apparatus 100 trains the first model based on the first training data group. For example, the information processing apparatus 100 stores the trained first model. For example, the first training data group contains training data pieces each specifying a characteristic value of the target object in association with a combination of the constituent values of a target object and the environmental value in the experiment on the target object. The combination corresponds to, for example, an existing experimental value.

The information processing apparatus 100 stores a second model. For example, the second model is a model that enables an allowable condition for an experiment on a target object to be identified according to the constituent values of the target object. For example, the allowable condition is specified by the melting point of a mixture. For example, the information processing apparatus 100 trains the second model based on the second training data group. For example, the information processing apparatus 100 stores the trained second model. For example, the second training data group contains training data pieces each specifying a combination of the constituent values of a target object and the allowable condition for the experiment on the target object according to the constituent values.

The information processing apparatus 100 receives a processing request from the client apparatus 201. In response to the processing request, the information processing apparatus 100 sets a first objective function and a second objective function each containing a penalty term based on the first model and the second model. For example, the first objective function is an objective function for searching for the value of a first objective variable based on the mean value identified with the first model. For example, the second objective function is an objective function for searching for the value of a second objective variable based on the deviation value identified with the first model. For example, the penalty term is set based on the allowable condition identified with the second model.

By performing multi-objective optimization using the set first objective function and second objective function, the information processing apparatus 100 generates a solution set for the combination of the constituent values of the target object and the environmental value in the experiment on the target object. A solution is also called, for example, a Pareto solution. The information processing apparatus 100 may transmit all the solutions in the solution set as experimental value candidates to the client apparatus 201.

The information processing apparatus 100 selects one solution in the solution set as a new experimental value candidate. The information processing apparatus 100 generates another experimental value candidate containing the same environmental value as in the selected experimental value candidate. For example, the information processing apparatus 100 fixes the environmental value in the experiment to the environmental value contained in the selected experimental value candidate, and generates, as another experimental value candidate, a combination of constituent values of a target object and the environmental value in the experiment on the target object.

For example, the information processing apparatus 100 sets a third objective function containing the penalty term based on the second model. For example, the third objective function is an objective function for searching for a value of a third objective variable based on distances from the existing experimental values specified by the training data pieces contained in the first training data group to the other experimental value candidate. For example, the penalty term is set based on the allowable condition identified with the second model. For example, the information processing apparatus 100 generates the other experimental value candidate by performing optimization using the third objective function.

The information processing apparatus 100 transmits the selected experimental value candidate and the generated other experimental value candidate to the client apparatus 201. The information processing apparatus 100 is, for example, a server, a PC, or the like.

The client apparatus 201 is a computer used by a user. The user is, for example, an operator who performs an experiment on target objects. The client apparatus 201 transmits a processing request to the information processing apparatus 100 based on an operation input by the user. The client apparatus 201 receives the experimental value candidates from the information processing apparatus 100. The client apparatus 201 outputs the experimental value candidates in a manner referable by the user. The client apparatus 201 is, for example, a PC, a tablet terminal, a smartphone, or the like.

The user performs the experiment on the target objects by using the synthesizer facility 202 in reference to the experimental value candidates. For example, the synthesizer facility 202 has a function capable of generating a target object. For example, the synthesizer facility 202 includes a firing furnace. For example, the user uses the firing furnace of the synthesizer facility 202 to generate the target object defined by the constituent values contained in each of the experimental value candidates at the environmental value contained in the experimental value candidate. For example, the user inspects the characteristic value of the generated target object. In this way, the user is enabled to efficiently perform the experiment on the target objects.

Although the case where the information processing apparatus 100 is an apparatus different from the client apparatus 201 has been described, embodiments are not limited thereto. For example, there may be a case where the information processing apparatus 100 has the functions as the client apparatus 201 and operates as the client apparatus 201 as well.

(Usage Example of Information Processing System 200)

For example, the information processing system 200 is used in a case such as one where a user desires to know what experimental value to set so as to maximize the conductivity of a mixture for use as a battery material. In this case, the target object is the mixture. An experiment is to synthesize the mixture and inspect the conductivity, which is the characteristic value of the mixture. In the process of synthesizing the mixture, the mixture is synthesized by heating. The environmental value is a heating temperature. The constituent values are a composition ratio of materials for forming the mixture. The allowable condition is specified by the melting point of the mixture. For example, the combination of the constituent values and the environmental value corresponds to an experimental value.

The information processing apparatus 100 generates an experimental value candidate by using a penalty term that acts to degrade the value of the objective variable in the case where a temperature serving as the environmental value exceeds the melting point of the mixture as compared with the case where the temperature is equal to lower than the melting point of the mixture. The information processing apparatus 100 outputs the generated experimental value candidate in a manner referable by the user. In this way, the user is enabled to recognize what experimental value to set so as to maximize the conductivity of the mixture for use as the battery material. In this way, the information processing apparatus 100 makes it possible to reduce the work burden on the user and reduce the cost for the experiment on target objects.

(Hardware Configuration Example of Information Processing Apparatus 100)

Next, a hardware configuration example of the information processing apparatus 100 will be described by using FIG. 3.

Figure 3:
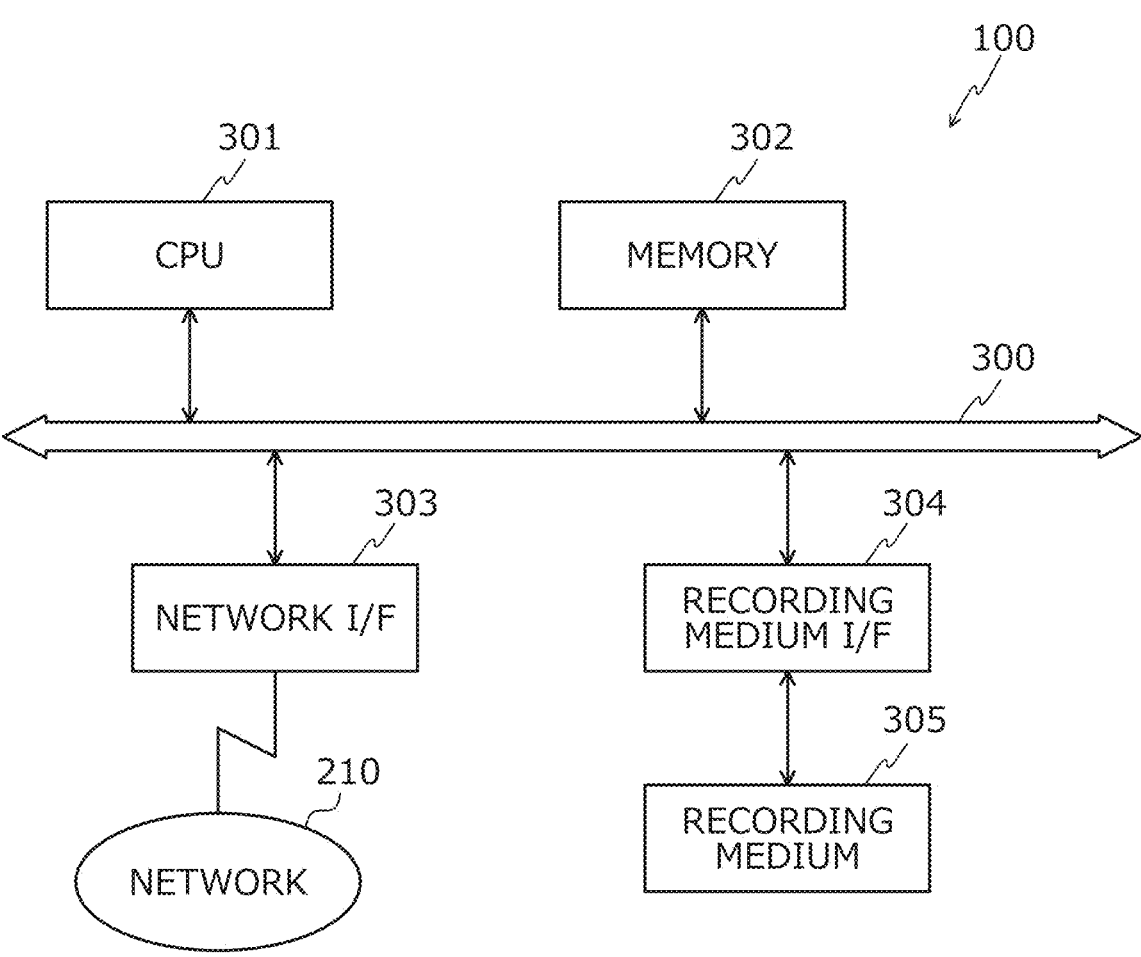
FIG. 3 is a block diagram illustrating a hardware configuration example of an information processing apparatus.

FIG. 3 is a block diagram illustrating a hardware configuration example of the information processing apparatus 100. In FIG. 3, the information processing apparatus 100 includes a central processing unit (CPU) 301, a memory 302, a network interface (I/F) 303, a recording medium I/F 304, and a recording medium 305. These components are coupled to each other through a bus 300.

The CPU 301 controls the entire information processing apparatus 100. The memory 302 includes, for example, a read-only memory (ROM), a random-access memory (RAM), a flash ROM, and the like. For example, the flash ROM or the ROM stores various programs, and the RAM is used as a work area for the CPU 301. When loaded by the CPU 301, the programs stored in the memory 302 cause the CPU 301 to execute coded processing.

The network I/F 303 is coupled to the network 210 through a communication line, and is coupled to another computer via the network 210. The network I/F 303 controls an interface between the network 210 and the inside of the information processing apparatus 100 so as to control inputs and outputs of data from and to the other computer. The network I/F 303 is, for example, a modem, a LAN adapter, or the like.

The recording medium I/F 304 controls reading and writing of data from and to the recording medium 305 under the control of the CPU 301. The recording medium I/F 304 is, for example, a disk drive, a solid-state drive (SSD), a Universal Serial Bus (USB) port, or the like. The recording medium 305 is a nonvolatile memory that stores data written under the control of the recording medium I/F 304. The recording medium 305 is, for example, a disk, a semiconductor memory, a USB memory, or the like. The recording medium 305 may be removably attached to the information processing apparatus 100.

In addition to the components described above, the information processing apparatus 100 may include, for example, a keyboard, a mouse, a display, a printer, a scanner, a microphone, a speaker, and so on. The information processing apparatus 100 may include multiple recording medium I/Fs 304 and multiple recording media 305. The information processing apparatus 100 does not have to include the recording medium I/F 304 and the recording medium 305.

(Hardware Configuration Example of Client Apparatus 201)

For example, a hardware configuration example of the client apparatus 201 is substantially the same as the hardware configuration example of the information processing apparatus 100 illustrated in FIG. 3. Thus, the description thereof is omitted herein.

(Functional Configuration Example of Information Processing Apparatus 100)

Next, a functional configuration example of the information processing apparatus 100 will be described by using FIG. 4.

Figure 4:
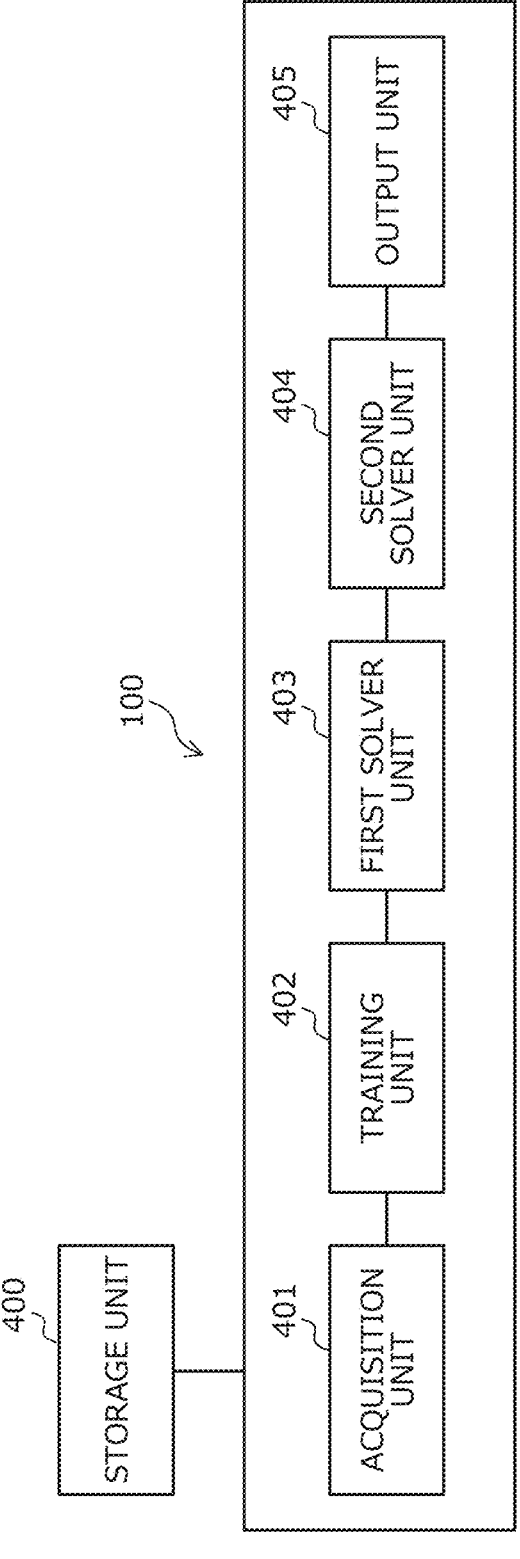
FIG. 4 is a block diagram illustrating a functional configuration example of the information processing apparatus.

FIG. 4 is a block diagram illustrating a functional configuration example of the information processing apparatus 100. The information processing apparatus 100 includes a storage unit 400, an acquisition unit 401, a training unit 402, a first solver unit 403, a second solver unit 404, and an output unit 405.

The storage unit 400 is implemented by, for example, a storage area such as the memory 302 or the recording medium 305 illustrated in FIG. 3. Hereinafter, a case where the storage unit 400 is included in the information processing apparatus 100 will be described, but embodiments are not limited thereto. For example, there may be a case where the storage unit 400 is included in an apparatus different from the information processing apparatus 100 and the information processing apparatus 100 is allowed to refer to information stored in the storage unit 400.

The acquisition unit 401 to the output unit 405 function as an example of a control unit. For example, the acquisition unit 401 to the output unit 405 implement their functions by causing the CPU 301 to execute a program stored in a storage area such as the memory 302 or the recording medium 305, or by using the network I/F 303, as illustrated in FIG. 3. A processing result by each functional unit is stored in, for example, a storage area such as the memory 302 or the recording medium 305 illustrated in FIG. 3.

The storage unit 400 stores various kinds of information to be referred to or updated in processing performed by the functional units. For example, the storage unit 400 stores the first training data group. For example, the first training data group contains training data pieces each specifying a characteristic value of the target object in association with a combination of the constituent values of a target object and the environmental value in the experiment on the target object. For example, the first training data group is acquired by the acquisition unit 401.

For example, a target object is considered to be a mixture. For example, the target object is defined by constituent values. When a target object is a mixture, the constituent values are considered to be, for example, a composition ratio of materials for forming the mixture. When a target object is a mixture, the characteristic value is considered to be, for example, the conductivity of the mixture.

For example, it is considered that the experiment is to generate a target object and inspect a characteristic value of the target object. For example, the experiment includes a process of generating the target object by heating. For example, when a target object is a mixture, the experiment includes a process of generating the mixture by heating and a process of inspecting the conductivity of the mixture. When a target object is a mixture, the environmental value is considered to be, for example, a heating temperature.

For example, the storage unit 400 stores the first model. For example, the first model is trained based on the first training data group. For example, the first model is a model that enables a mean value and a deviation value regarding a characteristic value of a target object to be identified according to a combination of the constituent values of the target object and an environmental value in an experiment on the target object. For example, the first model is a model that enables the mean value and the deviation value regarding a characteristic value of a mixture to be identified according to a combination of a composition ratio of the mixture and an environmental value in an experiment on the mixture. For example, the first model is expressed by a mathematical formula. For example, the first model may be expressed by a neural network or the like. For example, the first model is a Gaussian process regression model. For example, the first model is acquired by the acquisition unit 401. For example, the first model may be trained by the training unit 402.

For example, the storage section 400 stores the second training data group. For example, the second training data group contains training data pieces each specifying a combination of the constituent values of a target object and the allowable condition for the experiment on the target object according to the constituent values. For example, the allowable condition is considered to be a condition under which the experiment will not fail. When a target object is a mixture, the allowable condition is considered to be defined by, for example, the melting point of the mixture. The melting point is, for example, the melting point of the entire mixture. For example, the melting point may be the smallest value among the melting points of the materials for forming the mixture or the like. For example, the training data piece specifies a combination of the constituent values of the mixture and the melting point of the mixture according to the constituent values. For example, the second training data group is acquired by the acquisition unit 401.

For example, the storage unit 400 stores the second model. For example, the second model is trained based on the second training data group. For example, the second model is a model that enables an allowable condition for an experiment on a target object to be identified according to the constituent values of the target object. For example, the second model is a model that enables a melting point, which defines an allowable condition for an experiment on a mixture, to be identified according to a composition ratio of the mixture. For example, the second model is expressed by a mathematical formula. For example, the second model may be expressed by a neural network or the like. For example, the second model is a state prediction model. For example, the second model is acquired by the acquisition unit 401. For example, the second model may be trained by the training unit 402.

Although the case where the characteristic value is the conductivity of the target object has been described, embodiments are not limited thereto. For example, there may be a case where the characteristic value is a value other than the conductivity of the target object. For example, the characteristic value is considered to be a physical property value of the target object, such as hardness, viscosity coefficient, density, specific heat, thermal conductivity, or electric resistance.

Although the case where the experiment includes the process of generating the target object by heating has been described, embodiments are not limited thereto. For example, there may be a case where the experiment includes a process of denaturing the target object by pressurization. In this case, the environmental value is considered to be, for example, the pressure in the pressurization. In this case, the allowable condition is considered to be defined by, for example, the pressure resistance value of the target object.

Although the case where the target object is a mixture has been described, embodiments are not limited thereto. For example, there may be a case where the target object is something other than the mixture. For example, the target object is considered to be a device composed of assembled parts.

For example, when a target object is a device, the constituent values are considered to be values specifying a combination of parts for forming the device. For example, when a target object is a device, the characteristic value is considered to be a performance value of the device. When a target object is a device, the experiment is considered to include operating the device under a specific environment and inspecting a performance value of the device. The specific environment is considered to be, for example, an environment having a relatively high or low temperature or the like. When a target object is a device, the allowable condition is considered to be a temperature at which the device is operable.

The acquisition unit 401 acquires various kinds of information for use in processing performed by the functional units. The acquisition unit 401 stores the acquired various kinds of information in the storage unit 400 or outputs the acquired various kinds of information to the functional units. The acquisition unit 401 may output the various kinds of information stored in the storage unit 400 to the functional units. For example, the acquisition unit 401 acquires various kinds of information based on operation inputs by a user. For example, the acquisition unit 401 may receive the various kinds of information from an apparatus different from the information processing apparatus 100.

For example, the acquisition unit 401 acquires the first training data group. For example, in the case where the training unit 402 trains the first model, the acquisition unit 401 acquires the first training data group. For example, the acquisition unit 401 acquires the first training data group by receiving an input of the first training data group based on an operation input by the user. For example, the acquisition unit 401 acquires the first training data group by receiving the first training data group from another computer.

For example, the acquisition unit 401 acquires the second training data group. For example, in the case where the training unit 402 trains the second model, the acquisition unit 401 acquires the second training data group. For example, the acquisition unit 401 acquires the second training data group by receiving an input of the second training data group based on an operation input by the user. For example, the acquisition unit 401 acquires the second training data group by receiving the second training data group from another computer.

For example, the acquisition unit 401 acquires the first model. For example, in the case where the training unit 402 does not train the first model, the acquisition unit 401 acquires the first model. For example, the acquisition unit 401 acquires the first model by receiving an input of the first model based on an operation input by the user. For example, the acquisition unit 401 acquires the first model by receiving the first model from another computer.

For example, the acquisition unit 401 acquires the second model. For example, in the case where the training unit 402 does not train the second model, the acquisition unit 401 acquires the second model. For example, the acquisition unit 401 acquires the second model by receiving an input of the second model based on an operation input by the user. For example, the acquisition unit 401 acquires the second model by receiving the second model from another computer.

For example, the acquisition unit 401 may acquire a predetermined combination of the constituent values of a target object and an environmental value in an experiment on the target object. For example, the predetermined combination is used by the second solver unit 404. For example, the acquisition unit 401 acquires the predetermined combination. For example, the acquisition unit 401 acquires the predetermined combination by receiving an input of the predetermined combination based on an operation input by the user. For example, the acquisition unit 401 acquires the predetermined combination by receiving the predetermined combination from another computer.

The acquisition unit 401 may receive a start trigger for any of the functional units to start processing. The start trigger is, for example, a predetermined operation input by the user. For example, the start trigger may be a reception of predetermined information from another computer. For example, the start trigger may also be an output of predetermined information from any of the functional units.

For example, the acquisition unit 401 may accept an acquisition of the first training data group as a start trigger for the training unit 402 to start processing. For example, the acquisition unit 401 may accept an acquisition of the second training data group as a start trigger for the training unit 402 to start processing. For example, the acquisition unit 401 may accept an acquisition of the first model and the second model as a start trigger for the first solver unit 403 and the second solver unit 404 to start processing. For example, the acquisition unit 401 may accept an acquisition of the predetermined combination as a start trigger for the second solver unit 404 to start processing.

The training unit 402 trains the first model. For example, the training unit 402 trains the first model based on the first training data group acquired by the acquisition unit 401. In this way, the training unit 402 is capable of enabling the mean value and the deviation value regarding the characteristic value of the target object to be identified according to the combination of the constituent values of the target object and the environmental value in the experiment on the target object. Thus, the training unit 402 enables the first solver unit 403 to set the value of an objective variable to be used for multi-objective optimization.

The training unit 402 trains the second model. For example, the training unit 402 trains the second model based on the second training data group acquired by the acquisition unit 401. In this way, the training unit 402 is capable of enabling the allowable condition for the experiment on the target object to be identified according to the constituent values of the target object. Thus, the training unit 402 enables the first solver unit 403 to set the penalty term to be used for the multi-objective optimization. The training unit 402 enables the second solver unit 404 to set the penalty term to be used for the optimization.

The first solver unit 403 generates a solution set for a combination of the constituent values of a target object and the environmental value in the experiment on the target object by performing multi-objective optimization. For example, the first solver unit 403 generates the penalty term based on the allowable condition identified with the second model acquired by the acquisition unit 401. For example, the penalty term is a term that acts to degrade the value of an objective variable in the case where the allowable condition for the experiment is not satisfied as compared with the case where the allowable condition for the experiment is satisfied.

For example, the first solver unit 403 sets the first objective function which contains the generated penalty term and which is for use to search for the value of the objective variable based on the mean value identified with the first model acquired by the acquisition unit 401. For example, the first solver unit 403 sets the second objective function which contains the generated penalty term and which is for use to search for the value of the objective variable based on the deviation value identified with the first model acquired by the acquisition unit 401.

For example, the first solver unit 403 generates the solution set for the combination of the constituent values of the target object and the environmental value in the experiment on the target object by performing the multi-objective optimization using the set first objective function and the set second objective function. In this way, the first solver unit 403 is capable of obtaining the solution set including solutions appropriate for the experiment. The first solver unit 403 enables the user to use the solutions appropriate for the experiment. The first solver unit 403 enables the second solver unit 404 to further generate a solution appropriate for the experiment. For example, the first solver unit 403 enables the second solver unit 404 to refer to one solution appropriate for the experiment, which will serve as a guide for the second solver unit 404 to generate a solution appropriate for the experiment.

For example, the first solver unit 403 may generate a penalty term that acts to degrade the value of the objective variable in the case where the temperature for generating the mixture exceeds the melting point of the mixture, as compared with the case where the temperature is equal to or lower than the melting point of the mixture. In this way, the first solver unit 403 is capable of generating a solution set within a range in which the temperature for generating the mixture does not exceed the melting point of the mixture. Thus, the first solver unit 403 is capable of easily generating a solution set including solutions appropriate for an experiment.

For example, the first solver unit 403 may set a first objective function that searches for an upper limit value of a confidence interval based on the mean value identified with the acquired first model so as to maximize the upper limit value of the confidence interval. For example, the first solver unit 403 may set a second objective function that searches for the deviation value identified with the acquired first model so as to minimize the deviation value. In this way, the first solver unit 403 is capable of obtaining a solution for a combination of the constituent values of a target object and an environmental value in an experiment on the target object, while minimizing the deviation value, from a region in which an effective characteristic value specified by a training data piece contained in the first training data group is likely to exist.

For example, the first solver unit 403 may set a first objective function that searches for the mean value identified with the acquired first model so as to maximize the mean value. For example, the first solver unit 403 may set a second objective function that searches for the deviation value identified with the acquired first model so as to minimize the deviation value. In this way, the first solver unit 403 is capable of obtaining a solution for a combination of the constituent values of a target object and an environmental value in an experiment on the target object so as to minimize the deviation value, from a region having a relatively large number of existing combinations specified by the training data pieces contained in the first training data group.

For example, the first solver unit 403 may set a first objective function that searches for the mean value identified with the acquired first model so as to maximize the mean value. For example, the first solver unit 403 may set a second objective function that searches for the deviation value identified with the acquired first model so as to maximize the deviation value. In this way, the first solver unit 403 is capable of obtaining a solution for a combination of the constituent values of a target object and an environmental value in an experiment on the target object so as to maximize the deviation value, from a region having a relatively small number of existing combinations specified by the training data pieces contained in the first training data group.

Although the case where the first solver unit 403 causes both the first objective function and the second objective function to contain the generated penalty term has been described, embodiments are not limited thereto. For example, there may be a case where the first solver unit 403 causes only one of the first objective function and the second objective function to contain the generated penalty term.

The second solver unit 404 selects one solution from the solution set generated by the first solver unit 403. For example, the second solver unit 404 selects one solution that maximizes the objective variable based on the mean value identified with the first model, from the solution set generated by the first solver unit 403. For example, the second solver unit 404 selects one solution that maximizes the upper limit value of the confidence interval from the solution set generated by the first solver unit 403. In this way, the second solver unit 404 is capable of selecting one solution appropriate for the experiment. The second solver unit 404 is capable of using the selected solution as a guide to generating a solution appropriate for the experiment, and generating a solution appropriate for the experiment.

By performing the optimization, the second solver unit 404 generates a solution for a combination of the constituent values of a target object and the same environmental value as in the combination specified by the selected solution. For example, the second solver unit 404 generates a penalty term based on the allowable condition identified with the second model acquired by the acquisition unit 401. For example, the penalty term is a term that acts to degrade the value of an objective variable in the case where the allowable condition for the experiment is not satisfied as compared with the case where the allowable condition for the experiment is satisfied.

For example, the second solver unit 404 sets a combination set including a combination of the constituent values of a target object and the environmental value in the experiment on the target object, which are specified by each of the training data pieces contained in the first training data group. For example, the second solver unit 404 sets a third objective function which contains the generated penalty term and which is for use to search for a value of an objective variable based on distances from the combinations included in the combination set to a solution candidate combination containing the same environmental value as in the combination specified by the selected solution.

For example, the objective variable is a statistical value of the distances. Examples of the statistical value include a maximum value, a minimum value, a mean value, a mode value, a median value, and the like. For example, the statistical value is defined according to the k-nearest neighbors algorithm. For example, the statistical value is the mean value of the distances between the solution candidate combination and k combinations closest to the solution candidate combination in the combination set.

For example, by performing optimization using the set third objective function, the second solver unit 404 generates a solution for the combination of the constituent values of the target object and the same environmental value as in the combination specified by the selected solution. In this way, the second solver unit 404 is capable of further generating a solution appropriate for the experiment. The second solver unit 404 enables the user to refer to a plurality of solutions appropriate for an experiment. For example, the second solver unit 404 enables the user to refer to a plurality of simultaneously examinable solutions, thereby making it possible to reduce the work burden on the user in the experiment and reduce the cost for the experiment.

For example, the second solver unit 404 may add the combination specified by the generated solution to the set combination set. For example, the second solver unit 404 sets a fourth objective function for use to search for a value of an objective variable based on distances from the combinations included in the post-addition combination set to a solution candidate combination containing the same environmental value as in the combination specified by the selected solution.

For example, the objective variable is a statistical value of the distances. Examples of the statistical value include a maximum value, a minimum value, a mean value, a mode value, a median value, and the like. For example, the statistical value is defined according to the k-nearest neighbors algorithm. For example, the statistical value is the mean value of the distances between the solution candidate combination and k combinations closest to the solution candidate combination in the combination set.

For example, the second solver unit 404 generates a solution for the combination of the constituent values of the target object and the same environmental value as in the combination specified by the selected solution by performing optimization using the set fourth objective function. In this way, the second solver unit 404 is capable of further generating a solution appropriate for the experiment. The second solver unit 404 enables the user to refer to a plurality of solutions appropriate for an experiment. For example, the second solver unit 404 enables the user to refer to a plurality of simultaneously examinable solutions, thereby making it possible to reduce the work burden on the user in the experiment and reduce the cost for the experiment.

For example, the second solver unit 404 may set a third objective function which contains the generated penalty term and which is for use to search for a value of an objective variable based on the distances from the combinations included in the combination set to a solution candidate combination containing the same environmental value as in the acquired predetermined combination.

For example, the objective variable is a statistical value of the distances. Examples of the statistical value include a maximum value, a minimum value, a mean value, a mode value, a median value, and the like. For example, the statistical value is defined according to the k-nearest neighbors algorithm. For example, the statistical value is the mean value of the distances between the solution candidate combination and k combinations closest to the solution candidate combination in the combination set.

For example, the second solver unit 404 generates a solution for the combination of the constituent values of the target object and the same environmental value as in the acquired predetermined combination by performing optimization using the set third objective function. In this way, the second solver unit 404 is capable of generating a solution appropriate for the experiment. For example, the second solver unit 404 makes it possible to reduce the work burden on the user in the experiment and reduce the cost for the experiment.

For example, the second solver unit 404 may add the combination specified by the generated solution to the set combination set. For example, the second solver unit 404 sets a fourth objective function for use to search for a value of an objective variable based on the distances from the combinations included in the post-addition combination set to a solution candidate combination containing the same environmental value as in the acquired predetermined combination.

For example, the objective variable is a statistical value of the distances. Examples of the statistical value include a maximum value, a minimum value, a mean value, a mode value, a median value, and the like. For example, the statistical value is defined according to the k-nearest neighbors algorithm. For example, the statistical value is the mean value of the distances between the solution candidate combination and k combinations closest to the solution candidate combination in the combination set.

For example, the second solver unit 404 generates a solution for the combination of the constituent values of the target object and the same environmental value as in the acquired predetermined combination by performing optimization using the set fourth objective function. In this way, the second solver unit 404 is capable of further generating a solution appropriate for the experiment. The second solver unit 404 enables the user to refer to a plurality of solutions appropriate for an experiment. For example, the second solver unit 404 enables the user to refer to a plurality of simultaneously examinable solutions, thereby making it possible to reduce the work burden on the user in the experiment and reduce the cost for the experiment.

The output unit 405 outputs the processing result of at least any of the functional units. For example, the output form is display on a display, print output to a printer, transmission to an external apparatus through the network I/F 303, or storage in a storage area such as the memory 302 or the recording medium 305. Thus, the output unit 405 is capable of notifying the user of the processing result of at least any of the functional units, thereby improving the convenience of the information processing apparatus 100.

For example, the output unit 405 outputs all the solutions in the solution set generated by the first solver unit 403. For example, the output unit 405 outputs all the solutions in the solution set generated by the first solver unit 403 as a solution candidate appropriate for the experiment in a manner referable by the user. In this way, the output unit 405 enables the user to easily identify the solution appropriate for the experiment. The output unit 405 enables the user to select one solution appropriate for the experiment, which will serve as a guide for the second solver unit 404 to generate a solution appropriate for the experiment. Thus, the output unit 405 makes it possible to reduce the work burden on the user in the experiment and reduce the cost for the experiment.

For example, the output unit 405 outputs one solution selected by the second solver unit 404. For example, the output unit 405 outputs one solution selected by the second solver unit 404 as a solution candidate appropriate for the experiment in a manner referable by the user. In this way, the output unit 405 enables the user to refer to the solution appropriate for the experiment. Thus, the output unit 405 makes it possible to reduce the work burden on the user in the experiment and reduce the cost for the experiment.

For example, the output unit 405 outputs the solution generated by the second solver unit 404. For example, the output unit 405 outputs the solution generated by the second solver unit 404 as a solution candidate appropriate for the experiment in a manner referable by the user. In this way, the output unit 405 enables the user to refer to a plurality of solutions appropriate for the experiment. Thus, the output unit 405 makes it possible to reduce the work burden on the user in the experiment and reduce the cost for the experiment.

Although the case where the information processing apparatus 100 includes the acquisition unit 401, the training unit 402, the first solver unit 403, the second solver unit 404, and the output unit 405 has been described, embodiments are not limited thereto. For example, there may be a case where the information processing apparatus 100 does not include the training unit 402. For example, there may be a case where a computer including the training unit 402, a computer including the first solver unit 403, and a computer including the second solver unit 404 cooperate with each other to implement the functions as the information processing apparatus 100.

(Operation Example of Information Processing Apparatus 100)

First, an operation example of the information processing apparatus 100 will be described with reference to FIGS. 5 to 13. First, an example of a whole process 500 for a mixture to which the information processing apparatus 100 is applied will be described with reference to FIG. 5.

Figure 5:
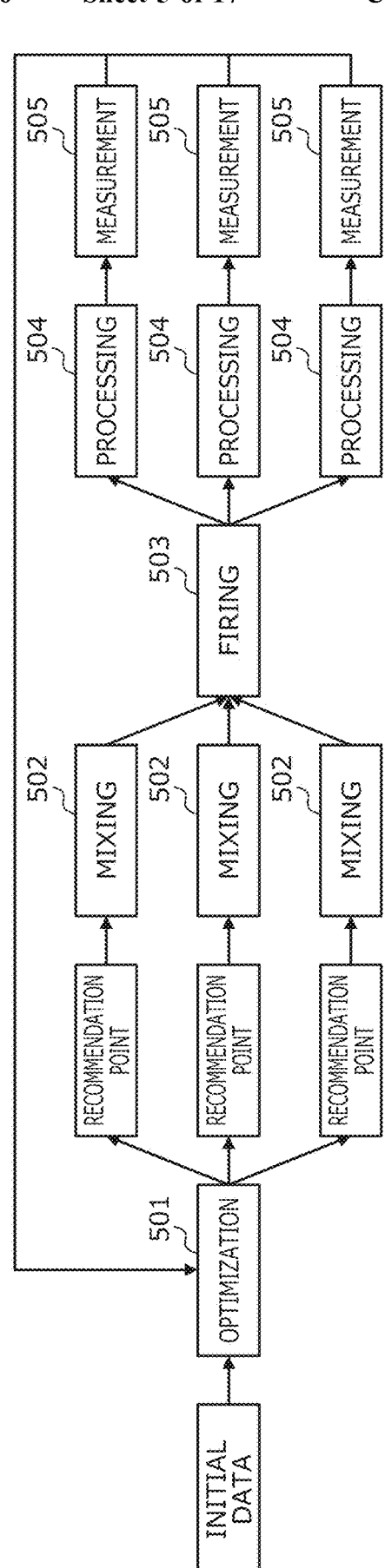
FIG. 5 is an explanatory diagram illustrating an example of a whole process.

FIG. 5 is an explanatory diagram illustrating an example of the whole process 500. In FIG. 5, a user desires to search for an appropriate parameter for generating a mixture. For example, the parameter includes a composition ratio of the mixture and a process condition for generating the mixture. The process condition is, for example, a firing temperature for generating the mixture. For example, the user desires to search for an appropriate parameter for generating a mixture so that the mixture may have desired conductivity.

The whole process 500 includes processes 501 to 505. The process 501 is a process of generating a recommendation point indicating an appropriate parameter candidate based on initial data. The initial data contains a first training data group containing training data pieces each specifying a combination of the conductivity of a mixture and an existing parameter specifying a combination of a composition ratio of the mixture and a process condition for generating the mixture. The initial data contains a second training data group containing training data pieces each specifying a combination of the composition ratio of a mixture and the melting point of the mixture.

For example, in the process 501, a Gaussian process regression model and a state prediction model are trained based on the initial data. For example, in the process 501, a single recommendation point is generated by performing multi-objective optimization using the Gaussian process regression model and the state prediction model as will be described later with reference to FIGS. 11 and 12.

For example, in the process 501, an additional recommendation point containing the same process condition as in the single recommendation point generated is generated by performing predetermined optimization using the state prediction model based on the generated recommendation point as will be described later with reference to FIG. 13. In the example of FIG. 5, three recommendation points are generated in the process 501. In this way, in the process 501, it is possible to generate a plurality of recommendation points at which simultaneous production of mixtures is possible. For example, the process 501 is performed by the information processing apparatus 100.

The process 502 is a process of generating a precursor of the mixture by mixing materials based on the composition ratio contained in each of the generated recommendation points. For example, the process 502 is performed by the user using the synthesizer facility 202.

The process 503 is a process of generating the mixture in such a way that the precursor of the mixture generated based on the composition ratio contained in each of the generated recommendation points is fired based on the process condition contained in the recommendation point. In the process 503, it is possible to fire N precursors of the mixtures simultaneously under the same process condition. For example, in the process 503, the precursors of the mixtures generated based on the composition ratios respectively contained in N recommendation points containing the same process condition are simultaneously fired. Since the plurality of recommendation points containing the same process condition are generated in the process 501, it is possible to efficiently generate a plurality of mixtures in the process 503.

The cost for the process 503 tends to be higher than the cost for any of the other processes 501, 502, 504, and 505. For example, a time taken for the process 501 is one minute. A time taken for the process 502 is one hour. A time taken for the process 504 is two hours. A time taken for the process 505 is three hours. Meanwhile, a time taken for the process 503 is 12 hours. For this reason, simultaneous generation of a plurality of mixtures in the process 503 makes it possible to reduce the cost for the whole process 500. For example, the process 503 is performed by the user using the synthesizer facility 202.

The process 504 is a process of processing the mixture. For example, the process 504 is performed by the user using the synthesizer facility 202. The process 505 is a process of measuring the conductivity of the mixture. For example, the process 505 is performed by the user using the synthesizer facility 202. When the conductivity measured in the process 505 is desired conductivity, the user determines that the appropriate parameter for generating the mixture having the desired conductivity has been found, and terminates the whole process 500.

When the conductivity measured in the process 505 is not the desired conductivity, the user adds a new training data piece specifying a combination of a recommendation point and the measured conductivity to the initial data. Thus, the processes 501 to 505 are iterated until the conductivity measured in the process 505 becomes the desired conductivity.

In this way, the information processing apparatus 100 enables the user to refer to the optimum parameter while reducing the cost for the whole process 500. Hereinafter, description will be given with reference to FIGS. 6 and 7 to explain contents in the initial data, and then will be given with reference to FIGS. 8 to 13 to explain how the information processing apparatus 100 implements the process 501. First, description with reference to FIG. 6 will be given.

FIG. 6 is an explanatory diagram illustrating an example of the first training data group. For example, the first training data group is stored by using a first training data management table 600. The first training data management table 600 is implemented by a storage area such as the memory 302 or the recording medium 305 of the information processing apparatus 100 illustrated in FIG. 3, for example.

As illustrated in FIG. 6, the first training data management table 600 has No., conductivity, P1, Li3BO3, Li3PO4, and Li2SO4 fields. In the first training data management table 600, a training data piece is stored as a record 600-$a$ by setting information in each of the fields. Here, "a" is a given integer.

A number allocated to a training data piece is set in the No. field. Conductivity of the mixture is set in the conductivity field. A process condition for generating the above mixture is set in the P1 field. The process condition is, for example, a firing temperature.

A proportion of a material Li3BO3, which is an element in the composition ratio of the above mixture, to the entire mixture is set in the Li3BO3 field. For example, a unit of the proportion is %. A proportion of a material Li3PO4, which is an element in the composition ratio of the above mixture, to the entire mixture is set in the Li3PO4 field. A proportion of a material Li2SO4, which is an element in the composition ratio of the above mixture, to the entire mixture is set in the Li2SO4 field. Next, description with reference to FIG. 7 will be given.

FIG. 7 is an explanatory diagram illustrating an example of the second training data group. For example, the second training data group is stored by using a second training data management table 700. The second training data management table 700 is implemented by a storage area such as the memory 302 or the recording medium 305 of the information processing apparatus 100 illustrated in FIG. 3, for example.

As illustrated in FIG. 7, the second training data management table 700 has No., melting point, Li3BO3, Li3PO4, and Li2SO4 fields. In the second training data management table 700, a training data piece is stored as a record 700-$b$ by setting information in each of the fields. Here, b is a given integer.

A number allocated to a training data piece is set in the No. field. A melting point of the mixture is set in the melting point field.

A proportion of a material Li3BO3, which is an element in the composition ratio of the above mixture, to the entire mixture is set in the Li3BO3 field. For example, a unit of the proportion is %. A proportion of a material Li3PO4, which is an element in the composition ratio of the above mixture, to the entire mixture is set in the Li3PO4 field. A proportion of a material Li2SO4, which is an element in the composition ratio of the above mixture, to the entire mixture is set in the Li2SO4 field. Next, with reference to FIG. 8, description will be given of an example in which the information processing apparatus 100 generates a Gaussian process regression model.

Figure 8:
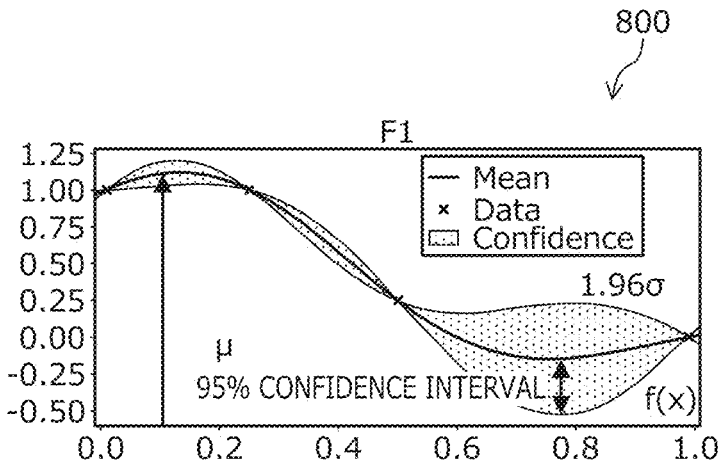
FIG. 8 is an explanatory diagram illustrating an example of generation of a Gaussian process regression model (part 1)
Figure 9:
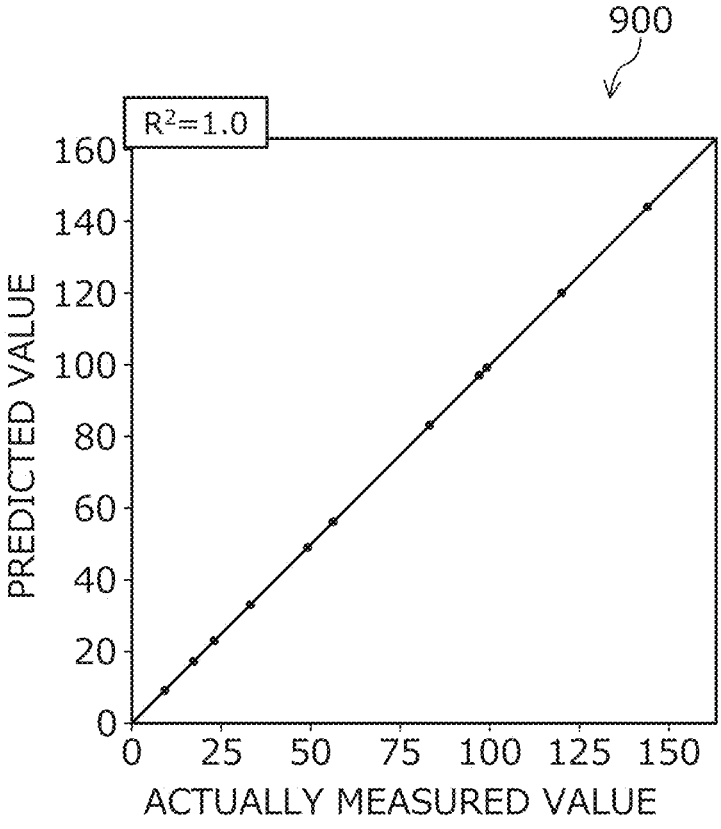
FIG. 9 is an explanatory diagram illustrating the example of the generation of the Gaussian process regression model (part 2)

FIGS. 8 and 9 are explanatory diagrams illustrating an example of generation of a Gaussian process regression model. In FIGS. 8 and 9, the information processing apparatus 100 generates the Gaussian process regression model based on the first training data group stored in the first training data management table 600.

For example, the Gaussian process regression model is a model including f(x) that makes it possible to calculate a mean value μ regarding predicted values of the conductivity to serve as the characteristic value. For example, the Gaussian process regression model further makes it possible to calculate a deviation value δ regarding the predicted values of the conductivity. The deviation value δ is, for example, a standard deviation. For example, the deviation value δ is a value corresponding to how low the reliability of the predicted value is.

For example, a relationship among the mean value μ, the deviation value δ, and training data pieces contained in the first training data group is illustrated in a graph 800 in FIG. 8. In the graph 800, Mean corresponds to the mean value μ, Confidence corresponds to the deviation value δ, and Data corresponds to the training data pieces contained in the first training data group. The deviation value σ in a region having a relatively small number of training data pieces tends to be a large value.

For example, as illustrated in a graph 900 in FIG. 9, the information processing apparatus 100 trains the Gaussian process regression model based on the first training data group such that actually measured values specified by the training data pieces contained in the first training data group and predicted values identified with the Gaussian process regression model are correlated with each other. For example, it is preferable that the information processing apparatus 100 train the Gaussian process regression model such that each plot indicating a combination of an actually measured value specified by a training data piece contained in the first training data group and a predicted value identified with the Gaussian process regression model is located on a diagonal line of the graph 900. In training the Gaussian process regression model, the information processing apparatus 100 may apply standardization to the conductivity, the composition ratio, and the like contained in a training data piece. Next, description with reference to FIG. 10 will be given.

Figure 10:
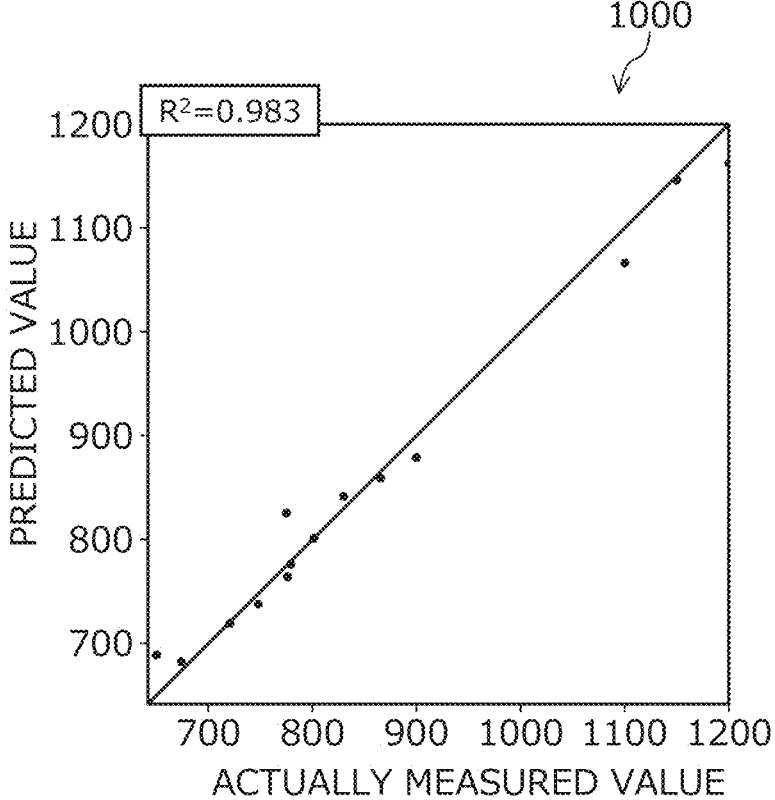
FIG. 10 is an explanatory diagram illustrating an example of generation of a state prediction model.

FIG. 10 is an explanatory diagram illustrating an example of generation of a state prediction model. In FIG. 10, the information processing apparatus 100 generates a state prediction model based on the second training data group stored in the second training data management table 700. For example, the state prediction model is a model that makes it possible to calculate a predicted value of a melting point.

For example, as illustrated in a graph 1000 in FIG. 10, the information processing apparatus 100 trains the state prediction model based on the second training data group such that the actually measured values specified by the training data pieces contained in the second training data group and predicted values identified with the state prediction model are correlated with each other. For example, it is preferable that the information processing apparatus 100 train the state prediction model such that each plot indicating a combination of an actually measured value specified by a training data piece contained in the second training data group and a predicted value identified with the state prediction model is located on a diagonal line of the graph 1000. Next, description with reference to FIGS. 11 and 12 will be given.

Figure 11:
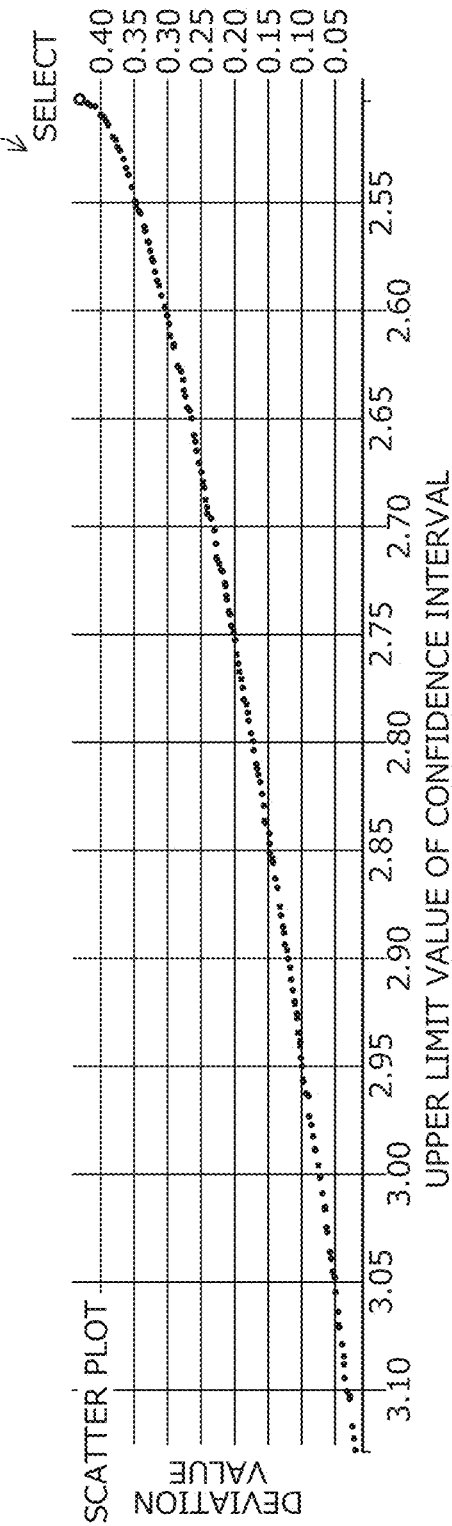
FIG. 11 is an explanatory diagram illustrating an example of selection of an effective recommendation point (part 1)
Figure 12:
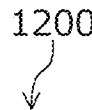
FIG. 12 is an explanatory diagram illustrating the example of the selection of the effective recommendation point (part 2)

FIGS. 11 and 12 are explanatory diagrams illustrating an example of selection of an effective recommendation point. In FIG. 11, the information processing apparatus 100 uses the Gaussian process regression model to set the first objective function for use to search for a value of a first objective variable based on the mean value of predicted values of the conductivity and the second objective function for use to search for a value of a second objective variable based on the deviation value of the predicted values of the conductivity.

For example, in a conceivable case, the information processing apparatus 100 sets the first objective variable for maximizing an upper limit value of a confidence interval based on the mean value of the predicted values of the conductivity and the second objective variable for minimizing the deviation value of the predicted values of the conductivity. In this case, for example, the information processing apparatus 100 sets the first objective function expressed by the following formula (1) and the second objective function expressed by the following formula (2).

$$F_1(x)=\mu(x)+1.96\sigma(x) \text{ goes to max} \tag{1}$$

$$F_2(x)=\sigma(x) \text{ goes to min} \tag{2}$$

In the above formulae, x is a vector representing a parameter. Then, x includes $x_c$ and $x_p$, where $x_c$ is a vector representing a composition ratio and $x_p$ is a vector representing a process condition. Meanwhile, μ(x) is the mean value of the predicted values of the conductivity corresponding to x and σ(x) is the deviation value of the predicted values of the conductivity corresponding to x.

With these, the information processing apparatus 100 is capable of setting the first objective function and the second objective function such that a recommendation point to serve as a new parameter may be generated so as to maximize the upper limit value of the confidence interval, from a region having a relatively large number of known effective parameters with which production of mixtures is possible. Thus, the information processing apparatus 100 is capable of setting the first objective function and the second objective function so as to meet a demand of a user. The demand of the user is, for example, to utilize known effective parameters and search for a recommendation point to serve as a new parameter with which production of a mixture having desired conductivity is possible, from a region relatively close to the known effective parameters.

For example, there may be a case where the information processing apparatus 100 sets the first objective variable for maximizing the mean value of the predicted values of the conductivity and the second objective variable for maximizing the deviation value of the predicted values of the conductivity. In this case, for example, the information processing apparatus 100 sets the first objective function expressed by the following formula (3) and the second objective function expressed by the following formula (4).

$$F_1(x)=\mu(x) \text{ goes to max} \tag{3}$$

$$F_2(x)=\sigma(x) \text{ goes to max} \tag{4}$$

With these, the information processing apparatus 100 is capable of setting the first objective function and the second objective function such that a recommendation point to serve as a new parameter may be generated so as to maximize the mean value, from a region having a relatively small number of known effective parameters with which production of mixtures is possible. Thus, the information processing apparatus 100 is capable of setting the first objective function and the second objective function so as to meet a demand of a user. The demand of the user is, for example, to search for a recommendation point to serve as a new parameter with which production of a mixture having desired conductivity is possible, from a region which is relatively far from known effective parameters and in which there are unknown parameters not subjected to the whole process 500 in the past.

For example, there may be a case where the information processing apparatus 100 sets the first objective variable for maximizing the mean value of the predicted values of the conductivity and the second objective variable for minimizing the deviation value of the predicted values of the conductivity. In this case, for example, the information processing apparatus 100 sets the first objective function expressed by the following formula (5) and the second objective function expressed by the following formula (6).

$$F_1(x) = \mu(x) \text{ goes to max} \tag{5}$$

$$F_2(x) = \sigma(x) \text{ goes to min} \tag{6}$$

With these, the information processing apparatus 100 is capable of setting the first objective function and the second objective function such that a recommendation point to serve as a new parameter may be generated so as to maximize the mean value, from a region having a relatively large number of known effective parameters with which production of mixtures is possible. Thus, the information processing apparatus 100 is capable of setting the first objective function and the second objective function so as to meet a demand of a user. The demand of the user is, for example, to utilize known effective parameters and search for a recommendation point to serve as a new parameter with which production of a mixture having desired conductivity is possible, from a region relatively close to the known effective parameters.

For example, the information processing apparatus 100 is assumed to set the first objective function expressed by the above formula (1) and the second objective function expressed by the above formula (2).

By using the state prediction model, the information processing apparatus 100 assigns a penalty term to the set first objective function and the set second objective function. For example, the penalty term acts to degrade the value of the first objective variable or the value of the second objective variable if the firing temperature $x_p$ as the process condition is higher by a tolerance $\varepsilon$ or more than the melting point $y_p(x_c)$ identified with the state prediction model. For example, $\varepsilon$ is a natural number. For example, $\varepsilon$ is 0.

For example, the information processing apparatus 100 sets a new first objective function expressed by the following formula (7) by assigning a penalty term $\alpha P_p(x_c, x_p)$ to the first objective function expressed by the above formula (1). Similarly, for example, the information processing apparatus 100 sets a new second objective function expressed by the following formula (8) by assigning the penalty term $\alpha P_p(x_c, x_p)$ to the second objective function expressed by the above formula (2).

$$F_1(x_c,x_p) - \alpha P_p(x_c, x_p) \text{ goes to max} \tag{7}$$

$$F_2(x_c,x_p) + \alpha P_p(x_c,x_p) \text{ goes to min} \tag{8}$$

For example, a is a constant. For example, the maximum value among the absolute values of the conductivity in the first training data group may be set as $\alpha$. Then, $P_p(x_c, x_p)$ is defined by the following formulae (9) and (10). For example, $P_p(x_c, x_p)$ takes a value of the following formula (9) if $x_p > y_p(x_c) + \varepsilon$. For example, $P_p(x_c, x_p)$ takes a value of the following formula (10) if $x_p \leq y_p(x_c) + \varepsilon$.

$$P_p(x_c,x_p) = (y_p(x_c) - x_p)_2 + C \tag{9}$$

$$P_p(x_c,x_p) = 0 \tag{10}$$

For example, C is a constant. For example, the maximum value among the absolute values of the conductivity in the first training data group may be set as C.

For example, there may be a case where the information processing apparatus 100 assigns the penalty term $\alpha P_p(x_c, x_p)$ to both of the first objective function expressed by the above formula (3) and the second objective function expressed by the above formula (4). For example, there may be a case where the information processing apparatus 100 assigns the penalty term $\alpha P_p(x_c, x_p)$ to both of the first objective function expressed by the above formula (5) and the second objective function expressed by the above formula (6).

The information processing apparatus 100 is assumed to set the new first objective function expressed by the above formula (7) and the new second objective function expressed by the above formula (8).

The information processing apparatus 100 generates a Pareto solution set by performing multi-objective optimization using the new first objective function expressed by the above formula (7) and the new second objective function expressed by the above formula (8). Each of Pareto solutions in the Pareto solution set may be a recommendation point specifying an appropriate parameter candidate. Since the Pareto solutions in the Pareto solution set are generated by using the penalty term, the Pareto solutions are likely to be appropriate parameter candidates.

For example, the information processing apparatus 100 generates a Pareto solution set illustrated in a graph 1100. The graph 1100 is a scatter plot. A black dot in the graph 1100 indicates a Pareto solution. A horizontal axis of the graph 1100 corresponds to, for example, a value of the first objective variable. A vertical axis of the graph 1100 corresponds to, for example, a value of the second objective variable. Next, description with reference to FIG. 12 will be given.

In FIG. 12, the information processing apparatus 100 selects one Pareto solution from the Pareto solution set as a recommendation point. For example, the information processing apparatus 100 selects, as a recommendation point 1200, the Pareto solution having the maximum upper limit value of the confidence interval in the Pareto solution set. As illustrated in FIG. 12, the recommendation point 1200 contains a process condition P1. The recommendation point 1200 contains a proportion of each of the materials Li3BO3, Li3PO4, and Li2SO4 in the mixture. Returning to FIG. 11, a white point in the graph 1100 indicates the Pareto solution selected as the recommendation point.

In this way, the information processing apparatus 100 enables the user to use the recommendation point to serve as an appropriate parameter candidate. For example, performing the multi-objective optimization by using the penalty term, the information processing apparatus 100 is capable of excluding recommendation points at which the process 503 may possibly fail and thereby easily generating recommendation points at which the process 503 may possibly succeed. For example, the information processing apparatus 100 enables the user to use a recommendation point at which the process 503 may possibly succeed. Accordingly, the information processing apparatus 100 makes it possible to reduce the work burden on the user and reduce the cost for the whole process 500.

Further, the information processing apparatus 100 is capable of further generating an additional recommendation point by using the selected recommendation point as a guide. The additional recommendation point is generated containing the same process condition as in the selected recommendation point, and defining another mixture producible simultaneously with the mixture based on the selected recommendation point.

For example, the information processing apparatus 100 may receive a designation of one Pareto solution in the Pareto solution set based on an operation input by the user, and select the designated Pareto solution as the recommendation point. Thus, the information processing apparatus 100 is capable of further generating an additional recommendation point by using the selected recommendation point as a guide.

The information processing apparatus 100 does not have to select any Pareto solution when the deviation values of the parameters specified by all the Pareto solutions in the Pareto solution set are equal to or smaller than a threshold. Thus, when the reliability of the Pareto solutions is relatively high, the information processing apparatus 100 is capable of skipping generation of an additional recommendation point, thereby making it possible to suppress an increase in the cost while maintaining a state where an effective recommendation point is referable by the user.

For example, the information processing apparatus 100 does not have to simultaneously select two or more Pareto solutions in the Pareto solution set as recommendation points. For example, since the Pareto solutions in the Pareto solution set contain different process conditions, it is difficult to simultaneously produce a plurality of mixtures based on the respective Pareto solutions. Accordingly, the information processing apparatus 100 does not have to simultaneously provide a user with two or more Pareto solutions in the Pareto solution set as two or more recommendation points. Next, description with reference to FIG. 13 will be given.

Figure 13:
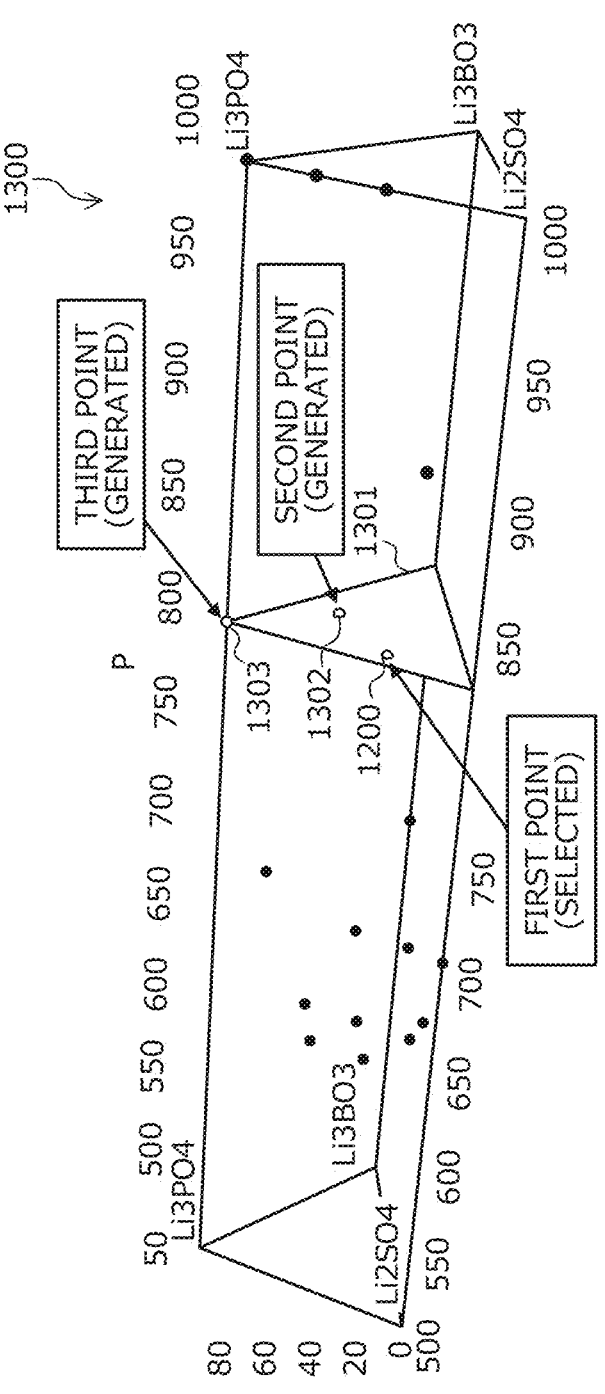
FIG. 13 is an explanatory diagram illustrating an example of generation of effective recommendation points.

FIG. 13 is an explanatory diagram illustrating an example of generation of effective recommendation points. In FIG. 13, a graph 1300 illustrates a space where parameters exist. In the graph 1300, horizontal axes indicate a firing temperature. Each of the three horizontal axes represents one of materials for forming a mixture. A black dot indicates an existing parameter specified by each training data piece in the first training data group. A black dot means that the closer to a horizontal axis, the larger the amount of the material represented by the horizontal axis contained in the mixture.

The information processing apparatus 100 generates an additional recommendation point from a process plane 1301 corresponding to the process condition contained in the selected recommendation point 1200. For example, the information processing apparatus 100 sets a recommendation point group in which parameters specified by respective training data pieces in the first training data group are included as existing recommendation points. The information processing apparatus 100 adds the selected recommendation point 1200 to the recommendation point group.

For example, the information processing apparatus 100 sets a third objective function for use to search for a value of a third objective variable based on the distances from the recommendation points included in the set recommendation point group to an additional recommendation point candidate. For example, the third objective variable is a statistical value of the distances from the recommendation points included in the recommendation point group to the additional recommendation point candidate. For example, the statistical value is calculated according to the k-nearest neighbors algorithm.

For example, the information processing apparatus 100 assigns the penalty term $\alpha P_p(x_c, x_p)$ to the set third objective variable to set a new third objective function expressed by the following formula (11). For example, the penalty term acts to degrade the value of the third objective variable when a firing temperature $x_p$ serving as the process condition is higher by a tolerance $\varepsilon$ or more than the melting point $y_p(x_c)$ identified with the state prediction model.

$$F = d(x_c) - \alpha P_p(x_c, x_p) \text{ goes to max} \tag{11}$$

For example, $d(x_c)$ is a statistical value of the distances from recommendation points included in a recommendation point group to an additional recommendation point candidate, calculated according to the k-nearest neighbors algorithm. For example, $d(x_c)$ is a statistical value of the distances to the additional recommendation point candidate from k recommendation points nearest to the additional recommendation point candidate in the recommendation point group. For example, k is 3. For example, $\alpha$ is a constant. For example, the maximum value among the absolute values of the conductivity in the first training data group may be set as $\alpha$.

$P_p(x_c, x_p)$ is defined by the following formulae (12) and (13). For example, $P_p(x_c, x_p)$ takes a value of the following formula (12) if $x_p > y_p(x_c) + \varepsilon$. For example, $P_p(x_c, x_p)$ takes a value of the following formula (13) if $x_p \leq y_p(x_c) + \varepsilon$.

$$P_p(x_c, x_p) = (y_p(x_c) - x_p)^2 + C \tag{12}$$

$$P_p(x_c, x_p) = 0 \tag{13}$$

For example, C is a constant. For example, the maximum value among the absolute values of the conductivity in the first training data group may be set as C. For example, $x_p$ is fixed to the process condition contained in the recommendation point 1200. For example, $x_p$ is 824.

For example, the information processing apparatus 100 generates an additional recommendation point 1302 by performing optimization using the third objective function expressed by the above formula (11). For example, the optimization is performed according to a method called tree Parzen estimator (TPE).

The information processing apparatus 100 determines whether or not the number of generated recommendation points is smaller than the number of recommendation points at which mixtures are producible under the same process condition. The number of recommendation points at which mixtures are producible under the same process condition is assumed to be three, for example. When the number of generated recommendation points is smaller than the number of recommendation points at which mixtures are producible under the same process condition, the information processing apparatus 100 determines that it is preferable to further generate an additional recommendation point. If the number of generated recommendation points is equal to or larger than the number of recommendation points at which mixtures are producible under the same process condition, the information processing apparatus 100 determines that an additional recommendation point does not have to be generated.

When the number of generated recommendation points is smaller than the number of recommendation points at which mixtures are producible under the same process condition, the information processing apparatus 100 may further determine whether or not the deviation values of the generated recommendation points are equal to or smaller than a threshold. When the deviation values of the generated recommendation points are larger than the threshold, the information processing apparatus 100 determines that it is preferable to generate an additional recommendation point. When the deviation values of the generated recommendation points are equal to or smaller than the threshold, the information processing apparatus 100 determines that an additional recommendation point does not have to be generated. In this way, the information processing apparatus 100 is capable of skipping generation of an additional recommendation point from a region where there are a relatively large number of existing recommendation points with the relatively small deviation values, thereby making it possible to suppress an increase in the cost while maintaining a state where an effective recommendation point is referable by the user.

In the example illustrated in FIG. 13, since the number of generated recommendation points is two, the recommendation points 1200 and 1302, and is smaller than three, which is the number of recommendation points at which mixtures are producible under the same process condition, the information processing apparatus 100 determines that it is preferable to further generate an additional recommendation point.

Accordingly, the information processing apparatus 100 adds the generated recommendation point 1302 to the recommendation point group. The information processing apparatus 100 sets a fourth objective function for use to search for a value of a fourth objective variable based on the distances from recommendation points included in the recommendation point group to an additional recommendation point candidate. For example, the fourth objective variable is a statistical value of the distances from the recommendation points included in the recommendation point group to the additional recommendation point candidate. For example, the statistical value is calculated according to the k-nearest neighbors algorithm. The information processing apparatus 100 assigns the penalty term $\alpha P_p(x_c, x_p)$ to the set fourth objective variable to set a new fourth objective function. For example, the new fourth objective function is the same as the third objective function expressed by the above formula (11). By performing optimization using the new fourth objective function, the information processing apparatus 100 further generates an additional recommendation point 1303.

Since the number of the generated recommendation points is three, the recommendation points 1200, 1302, and 1303, and is equal to or larger than three, which is the number of recommendation points at which mixtures are producible under the same process condition, the information processing apparatus 100 determines that an additional recommendation point does not have to be generated. The information processing apparatus 100 outputs the generated recommendation points 1200, 1302, and 1303 in a manner referable by the user.

In this way, the information processing apparatus 100 enables the user to use recommendation points to serve as appropriate parameter candidates. For example, performing the optimization by using the penalty term, the information processing apparatus 100 is capable of excluding recommendation points at which the process 503 may possibly fail and thereby easily generating recommendation points at which the process 503 may possibly succeed. For example, the information processing apparatus 100 enables the user to use an additional recommendation point at which the process 503 may possibly succeed. Accordingly, the information processing apparatus 100 makes it possible to reduce the work burden on the user and reduce the cost for the whole process 500.

Further, the information processing apparatus 100 is capable of obtaining a plurality of recommendation points at which mixtures are producible under the same process condition from the process plane 1301 fixed to the process condition. Thus, the information processing apparatus 100 enables the user to simultaneously produce a plurality of mixtures based on the plurality of recommendation points in the process 503. Accordingly, the information processing apparatus 100 enables the synthesizer facility 202 and the like to efficiently run in the process 503. Thus, the information processing apparatus 100 makes it possible to reduce the work burden on the user and reduce the cost for the whole process 500.

For example, there is a case where a user desires to measure the conductivity of mixtures for all of six new recommendation points by performing the whole process 500 one or more times. Meanwhile, the information processing apparatus 100 is capable of generating three new recommendation points at one time. For this reason, the information processing apparatus 100 may provide the user with the six new recommendation points in two cycles. For example, as described above, the time taken for the process 501 is one minute. The time taken for the process 502 is one hour. The time taken for process 503 is 12 hours. The time taken for the process 504 is two hours. The time taken for the process 505 is three hours. Accordingly, by taking 60 hours={(1+2+3)×3+12}×2 cycles to perform the whole process 500 twice, the information processing apparatus 100 enables measurement of the conductivity of the mixtures for all the six new recommendation points.

In contrast, the method in the related art such as Bayesian optimization is capable of generating only one new recommendation point at one time for one process condition, and is capable of providing the user with only one new recommendation point at one time for one process condition. Accordingly, in the method in the related art, it is not possible to measure the conductivity of the mixtures for all the six new recommendation points unless 108 hours=(1+ 12+2+3)×6 cycles are taken to perform the whole process 500 six times. As described above, the information processing apparatus 100 may reduce the work burden on the user and reduce the cost for the whole process 500 as compared with the method in the related art. Next, description with reference to FIG. 14 will be given.

FIG. 14 is an explanatory diagram illustrating an example of an effect produced by the information processing apparatus 100. A table 1400 in FIG. 14 specifies the recommendation points 1200, 1302, and 1303 generated by the information processing apparatus 100. The recommendation point 1200 is the first recommendation point selected. The recommendation point 1302 is the second recommendation point generated. The recommendation point 1303 is the third recommendation point generated.

The table 1400 includes P1, Li3BO3, Li3PO4, Li2SO4, Mean, and Std fields. The process condition specified by a recommendation point is set in the P1 field. The proportion of the Li3BO3 material to the mixture specified by the recommendation point is set in the Li3BO3 field. The proportion of the Li3PO4 material to the mixture specified by the recommendation point is set in the Li3PO4 field. The proportion of the Li2SO4 material to the mixture specified by the recommendation point is set in the Li2SO4 field. The mean value of the conductivity of the mixture is set in the Mean field. The deviation value of the conductivity of the mixture is set in the Std field.

A method of generating an additional recommendation point without using a penalty term is considered. A table 1410 in FIG. 14 illustrates an example of recommendation points generated according to this method.

The table 1410 includes P1, Li3BO3, Li3PO4, and Li2SO4 fields. The process condition specified by a recommendation point is set in the P1 field. The proportion of the Li3BO3 material to the mixture specified by the recommendation point is set in the Li3BO3 field. The proportion of the Li3PO4 material to the mixture specified by the recommendation point is set in the Li3PO4 field. The proportion of the Li2SO4 material to the mixture specified by the recommendation point is set in the Li2SO4 field.

According to this method, the second recommendation point does not satisfy a constraint condition of $x_p \leq y_p(x_c) + \varepsilon$. Accordingly, there is a problem that the user may perform the process 503 based on the recommendation point at which the process 503 may possibly fail and the cost for the whole process 500 is likely to increase.

In contrast, the information processing apparatus 100 is capable of generating the recommendation points 1200, 1302, and 1303 such that they satisfy the constraint condition of $x_p \leq y_p(x_c) + \varepsilon$. The recommendation points 1200, 1302, and 1303 are recommendation points at which the process 503 may possibly succeed. As described above, using the penalty term, the information processing apparatus 100 enables efficient execution of the whole process 500 so as to avoid a failure of the process 503, thereby making it possible to reduce the cost for the whole process 500.

(Overall Processing Procedure)

An example of an overall processing procedure executed by the information processing apparatus 100 will be described with reference to FIGS. 15 and 16. The overall processing is implemented, for example, by the CPU 301, the storage area such as the memory 302 or the recording medium 305, and the network I/F 303 illustrated in FIG. 3.

Figure 15:
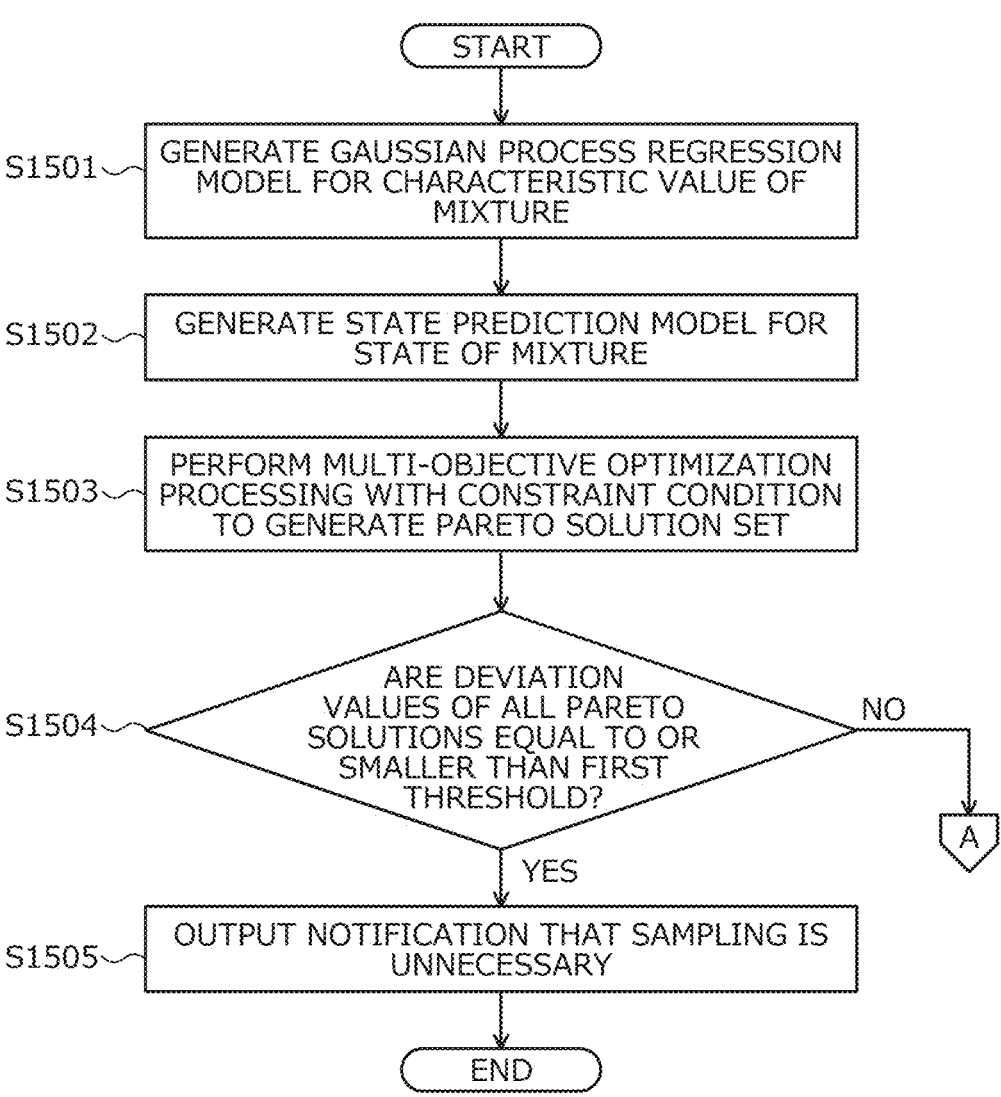
FIG. 15 is a flowchart illustrating an example of an overall processing procedure (part 1)

FIGS. 15 and 16 are flowcharts illustrating an example of the overall processing procedure. In FIG. 15, the information processing apparatus 100 generates a Gaussian process regression model for a characteristic value of a mixture based on a first training data group regarding the characteristic value of the mixture (step S1501).

Next, the information processing apparatus 100 generates a state prediction model for a state of the mixture based on a second training dataset group regarding the state of the mixture (step S1502). The information processing apparatus 100 executes multi-objective optimization processing based on the Gaussian process regression model with a constraint condition based on the state prediction model, and generates a Pareto solution set for a combination of the composition ratio of a mixture and the process condition (step S1503).

After that, the information processing apparatus 100 determines whether or not the deviation values of all the Pareto solutions in the Pareto solution set are equal to or smaller than a first threshold (step S1504). If the deviation values of all the Pareto solutions are equal to or smaller than the first threshold (step S1504: Yes), the information processing apparatus 100 proceeds to processing in step S1505. On the other hand, if any of the deviation values of the Pareto solutions is larger than the first threshold (step S1504:No), the information processing apparatus 100 proceeds to processing in step S1601 in FIG. 16.

In step S1505, the information processing apparatus 100 outputs a notification that sampling is unnecessary (step S1505). The information processing apparatus 100 ends the overall processing. Next, description with reference to FIG. 16 will be given.

In FIG. 16, the information processing apparatus 100 selects one Pareto solution from the Pareto solution set (step S1601).

Based on the process condition in the selected Pareto solution, the information processing apparatus 100 fixes a process plane where to obtain a recommendation point (step S1602). The information processing apparatus 100 sets a recommendation point group in which a combination of a composition ratio in a mixture and a process condition specified by each first training data piece in the first training dataset group regarding the characteristic value of the mixture is included as an existing recommendation point (step S1603).

Next, the information processing apparatus 100 adds the combination of the composition ratio of the mixture and the process condition specified by the selected Pareto solution to the set recommendation point group as a new recommendation point (step S1604). The information processing apparatus 100 generates a new recommendation point by executing optimization processing with a constraint condition based on the state prediction model to search the fixed process plane for a new recommendation point that maximizes the distances to the recommendation points included in the recommendation point group (step S1605).

The information processing apparatus 100 calculates a deviation value of the generated new recommendation point by using the Gaussian process regression model (step S1606). The information processing apparatus 100 determines whether or not the calculated deviation value is equal to or smaller than a second threshold (step S1607). If the deviation value is equal to or smaller than the second threshold (step S1607: Yes), the information processing apparatus 100 ends the overall processing. On the other hand, if the deviation value is larger than the second threshold (step S1607: No), the information processing apparatus 100 proceeds to processing in step S1608.

In step S1608, the information processing apparatus 100 adds the generated new recommendation point to the set recommendation point group (step S1608). Next, the information processing apparatus 100 determines whether or not the number of new recommendation points generated is smaller than the number of recommendation points examinable under the same process condition (step S1609). If the number of new recommendation points is smaller than the number of recommendation points examinable under the same process condition (step S1609: Yes), the information processing apparatus 100 returns to the processing in step S1605.

On the other hand, if the number of new recommendation points is equal to or larger than the number of recommendation points examinable under the same process condition (step S1609: No), the information processing apparatus 100 ends the overall processing. In this way, the information processing apparatus 100 is capable of generating a plurality of effective recommendation points and makes it possible to reduce the work burden on the user.

(Solving Processing Procedure)

An example of a solving processing procedure executed by the information processing apparatus 100 will be described with reference to FIG. 17. Solving processing is implemented, for example, by the CPU 301, a storage area such as the memory 302 or the recording medium 305, and the network I/F 303 illustrated in FIG. 3.

Figure 17:
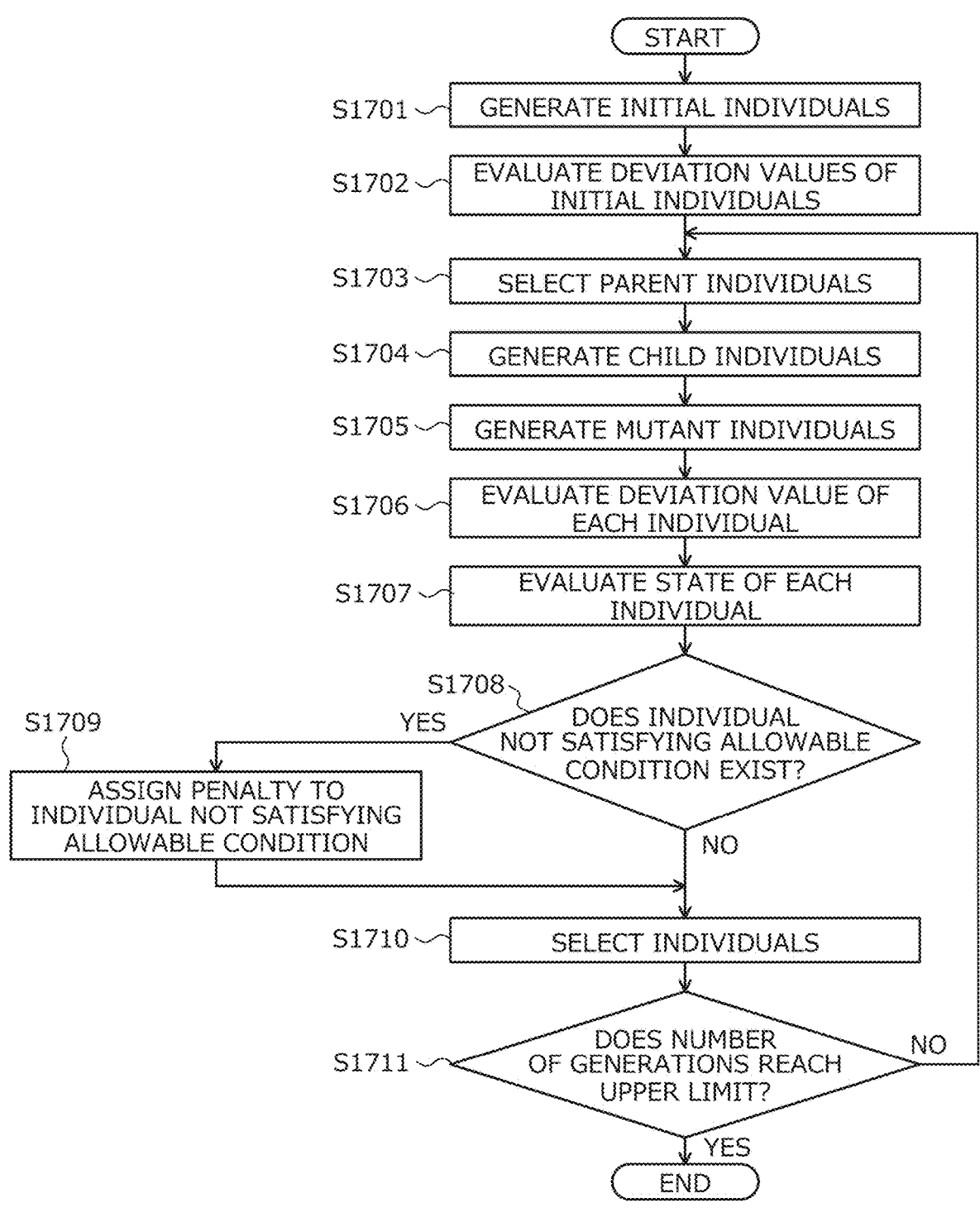
FIG. 17 is a flowchart illustrating an example of a solving processing procedure.

FIG. 17 is a flowchart illustrating an example of the solving processing procedure. In FIG. 17, the information processing apparatus 100 generates one or more initial individuals each representing a Pareto solution candidate, and sets the initial individuals in a population (step S1701).

Next, the information processing apparatus 100 evaluates a deviation value of each initial individual by using the Gaussian process regression model (step S1702). The information processing apparatus 100 selects parent individuals from the population (step S1703).

Next, the information processing apparatus 100 generates child individuals from the selected parents individual and adds the child individuals to the population (step S1704). The information processing apparatus 100 generates mutant individuals and adds the mutant individuals to the population (step S1705).

The information processing apparatus 100 evaluates the deviation value of each individual in the population by using the Gaussian process regression model (step S1706). The information processing apparatus 100 evaluates the state of each individual in the population by using the state prediction model (step S1707).

The information processing apparatus 100 determines based on the evaluated states whether or not an individual that does not satisfy the allowable condition exists in the population (step S1708). If an individual that does not satisfy the allowable condition exists (step S1708: Yes), the information processing apparatus 100 proceeds to processing in step S1709. On the other hand, if any individual that does not satisfy the allowable condition does not exist (step S1708: No), the information processing apparatus 100 proceeds to processing in step S1710.

In step S1709, the information processing apparatus 100 assigns a penalty to the individual that does not satisfy the allowable condition in the population (step S1709). The information processing apparatus 100 proceeds to the processing in step S1710.

In step S1710, the information processing apparatus 100 selects some individuals from the population and removes the unselected individuals from the population (step S1710). Next, the information processing apparatus 100 determines whether or not the number of generations reaches an upper limit (step S1711). If the number of generations does not reach the upper limit (step S1711: No), the information processing apparatus 100 returns to the processing in step S1703. On the other hand, if the number of generations reaches the upper limit (step S1711: Yes), the information processing apparatus 100 ends the solving processing.

The information processing apparatus 100 may execute the processing in each of the flowcharts illustrated in FIGS. 15 to 17 with the order of some steps reversed. For example, the order of the processing in step S1607 and the processing in steps S1608 and S1609 may be reversed. The information processing apparatus 100 may skip the processing in some steps in each of the flowcharts illustrated in FIGS. 15 to 17. For example, the processing in step S1607 may be skipped.

As described above, the information processing apparatus 100 is capable of acquiring a first model that enables the mean value and the deviation value regarding a characteristic value of a target object to be identified according to a combination of constituent values of the target object and an environmental value in an experiment on the target object. The information processing apparatus 100 is capable of acquiring a second model that enables an allowable condition for the experiment on the target object to be identified according to the constituent values of the target object. The information processing apparatus 100 is capable of generating a penalty term based on the allowable condition for the experiment identified with the acquired second model. The information processing apparatus 100 is capable of setting a first objective function for use to search for a value of a first objective variable based on the mean value identified with the acquired first model and a second objective function for use to search for a value of a second objective variable based on the deviation value identified with the acquired first model. The information processing apparatus 100 is capable of generating a solution set for the combination of the constituent values of the target object and the environmental value in the experiment on the target object by performing multi-objective optimization using the penalty term, the first objective function, and the second objective function. In this way, the information processing apparatus 100 is capable of obtaining a solution to serve as an effective experimental value by using the penalty term, and thereby makes it possible to reduce the work burden on the user and reduce the cost for the experiment.

The information processing apparatus 100 is capable of setting the first objective function which contains the penalty term based on the allowable condition for the experiment identified with the acquired second model and which is for use to search for the value of the first objective variable based on the mean value identified with the acquired first model. The information processing apparatus 100 is capable of setting the second objective function which contains the penalty term based on the allowable condition for the experiment identified with the acquired second model and which is for use to search for the value of the second objective variable based on the deviation value identified with the acquired first model. In this way, the information processing apparatus 100 is capable of causing both the first objective function and the second objective function to contain the penalty term, and thereby makes it easy to obtain a solution to serve as an effective experimental value.

The information processing apparatus 100 is capable of selecting one solution in the generated solution set. The information processing apparatus 100 is capable of setting a third objective function for use to search for a value of a third objective variable based on the distances from the combinations specified by training data pieces included in a first training data group to a solution candidate containing the same environmental value in the experiment on the target object as in the selected solution. The information processing apparatus 100 is capable of causing the third objective function to contain the penalty term based on the allowable condition for the experiment identified with the acquired second model. The information processing apparatus 100 is capable of generating a solution for a combination of the constituent values of a target object and the same environmental value in the experiment on the target object as in the selected solution by performing optimization using the third objective function. In this way, the information processing apparatus 100 is capable of generating a solution to serve as an additional experimental value, and thereby makes it possible to simultaneously examine a plurality of solutions, reduce the work burden on the user, and reduce the cost for the experiment.

The information processing apparatus 100 is capable of setting a fourth objective function for use to search for a value of a fourth objective variable based on the distances from the combinations specified by the generated solution and the training data pieces included in the first training data group to a solution candidate containing the same environmental value in the experiment on the target object as in the selected solution. The information processing apparatus 100 is capable of causing the fourth objective function to contain the penalty term based on the allowable condition for the experiment identified with the acquired second model. The information processing apparatus 100 is capable of further generating a solution for a combination of the constituent values of a target object and the same environmental value in the experiment on the target object as in the selected solution by performing optimization using the fourth objective function. In this way, the information processing apparatus 100 is capable of generating a solution to serve as an additional experimental value, and thereby makes it possible to simultaneously examine a plurality of solutions, reduce the work burden on the user, and reduce the cost for the experiment.

The information processing apparatus 100 is capable of adopting, as the first objective function, an objective function for use to search for an upper limit value of a confidence interval based on the mean value identified with the acquired first model so as to maximize the upper limit value of the confidence interval. The information processing apparatus 100 is capable of adopting, as the second objective function, an objective function for use to search for the deviation value identified with the acquired first model so as to minimize the deviation value. In this way, the information processing apparatus 100 is capable of generating a solution to serve as an experimental value so as to maximize the upper limit value of the confidence interval from a region where a relatively large number of existing experimental values exist. Thus, the information processing apparatus 100 is capable of meeting a user's demand to search a region relatively close to the existing experimental values to find out an experimental value with which generation of a target object having a desired characteristic is possible.

The information processing apparatus 100 is capable of adopting, as the first objective function, an objective function for use to search for the mean value identified with the acquired first model so as to maximize the mean value. The information processing apparatus 100 is capable of adopting, as the second objective function, an objective function for use to search for the deviation value identified with the acquired first model so as to minimize the deviation value. In this way, the information processing apparatus 100 is capable of generating a solution to serve as an experimental value so as to maximize the mean value from a region where a relatively large number of existing experimental values exist. Thus, the information processing apparatus 100 is capable of meeting a user's demand to search a region relatively close to the existing experimental values to find out an experimental value with which generation of a target object having a desired characteristic is possible.

The information processing apparatus 100 is capable of adopting, as the first objective function, an objective function for use to search for the mean value identified with the acquired first model so as to maximize the mean value. The information processing apparatus 100 is capable of adopting, as the second objective function, an objective function for use to search for the deviation value identified with the acquired first model so as to maximize the deviation value. In this way, the information processing apparatus 100 is capable of generating a solution to serve as an experimental value so as to maximize the mean value from a region where a relatively small number of existing experimental values exist. Thus, the information processing apparatus 100 is capable of meeting a user's demand to search a region which is relatively far from the existing experimental values and which has experimental values not examined in the past to find out a new experimental value with which production of a target object having a desired characteristic is possible.

As described above, according to the information processing apparatus 100, it is possible to adopt a mixture as the target object. According to the information processing apparatus 100, it is possible to adopt the composition ratio of materials for forming the mixture as the constituent values. According to the information processing apparatus 100, it is possible to adopt an experiment including a process of generating a mixture by heating as the experiment on the target object. According to the information processing apparatus 100, it is possible to adopt a heating temperature as the environmental value in the experiment on the target object. According to the information processing apparatus 100, it is possible to adopt a melting point of the mixture as the allowable condition for the experiment on the target object. According to the information processing apparatus 100, it is possible to adopt, as a penalty term, a term that acts to degrade the value of an objective variable in the case where a temperature exceeds the melting point as compared with the case where the temperature is equal to or lower than the melting point. In this way, the information processing apparatus 100 makes it possible to reduce the cost for an experiment including a process of generating mixtures by heating.

The information processing apparatus 100 is capable of selecting one solution that maximizes the upper limit value of the confidence interval from the generated solution set. In this way, the information processing apparatus 100 is capable of generating a solution to serve as an additional experimental value based on the upper limit value of the confidence interval.

The information processing apparatus 100 is capable of acquiring a predetermined combination of constituent values of a target object and an environmental value in an experiment on the target object. The information processing apparatus 100 is capable of acquiring the first training data group containing training data pieces each specifying a characteristic value of a target object in association with a combination of constituent values of the target object and an environmental value in an experiment on the target object. The information processing apparatus 100 is capable of acquiring a model that enables an allowable condition for an experiment on a target object to be identified according to the constituent values of the target object. The information processing apparatus 100 is capable of setting an objective function for use to search for a value of an objective variable based on the distances from the combinations specified by the training data pieces contained in the acquired first training data group to the acquired predetermined combination. The information processing apparatus 100 is capable of causing the set objective function to contain the penalty term based on the allowable condition for the experiment identified with the acquired model. The information processing apparatus 100 is capable of generating a solution for a combination of the constituent values of a target object and the same environmental value in the experiment on the target object as in the acquired predetermined combination by performing optimization using the objective function containing the penalty term based on the allowable condition for the experiment identified with the acquired model. In this way, the information processing apparatus 100 is capable of generating a plurality of solutions to serve as a plurality of experimental values simultaneously examinable, and thereby makes it possible to reduce the work burden on the user and reduce the cost for the experiment.

The information processing method described in the embodiment may be implemented by causing a computer, such as a personal computer (PC) or a workstation, to execute a program prepared in advance. The information processing program described in the embodiment is recorded on a computer-readable recording medium and is read from the recording medium to be executed by the computer. The recording medium is a hard disk, a flexible disk, a compact disc (CD)-ROM, a magneto-optical (MO) disk, a Digital Versatile Disc (DVD), or the like. The information processing program described in the embodiment may be distributed via a network, such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing an information processing program that causes at least one computer to execute a process, the process comprising:

acquiring a first model trained using a first training data group to predict, from a combination of (i) constituent values of a target object and (ii) an environmental value in an experiment on the target object, a mean value of a characteristic value of the target object and a deviation value of the characteristic value, the first training data group including first training data pieces, each piece of the first training data pieces including a characteristic value of a respective first target object and a respective first combination of (i) constituent values of the respective first target object and (ii) a first environmental value in an experiment on the respective first target object;

acquiring a second model trained using a second training data group to predict an allowable condition for the experiment on the target object from the constituent values of the target object, the second training data group including second training pieces, each of the second training pieces including (i) constituent values of a respective second target and (ii) an allowable condition for an experiment on the respective second target; and generating a solution set of the combination of the constituent values and the environmental value for the target object by performing multi-objective optimization using (i) a penalty term based on the allowable condition identified by the acquired second model, (ii) a first objective function for searching for a value of a first objective variable based on the mean value identified by the acquired first model, and (iii) a second objective function for searching for a value of a second objective variable based on the deviation value identified by the acquired first model.

2. The non-transitory computer-readable storage medium according to claim 1, wherein the generating includes performing multi-objective optimization by use of the first objective function that contains the penalty term, and the second objective function that contains the penalty term.

3. The non-transitory computer-readable storage medium according to claim 1, wherein the process further includes:

selecting one solution from the generated solution set; and generating a solution for a combination of the constituent values and a second environmental value same as a third environmental value included in the selected solution by performing optimization by use of a third objective function that contains the penalty term and that is for use to search for a value of a third objective variable based on distances from the respective first combination in the first training data group to a solution candidate that contains the second environmental value.

4. The non-transitory computer-readable storage medium according to claim 3, wherein the generating of the solution further includes:

generating a solution for a combination of the constituent values and the second environmental value by performing optimization by use of a fourth objective function that contains the penalty term and that is for use to search for a value of a fourth objective variable based on distances from a combination specified by the generated solution to a solution candidate that contains the second environmental value.

5. The non-transitory computer-readable storage medium according to claim 1, wherein the first objective function is an objective function for use to search for an upper limit value of a confidence interval based on the mean value identified with the acquired first model so as to maximize the upper limit value of the confidence interval, and the second objective function is an objective function for use to search for the deviation value identified with the acquired first model so as to minimize the deviation value.

6. The non-transitory computer-readable storage medium according to claim 1, wherein the first objective function is an objective function for use to search for the mean value identified with the acquired first model so as to maximize the mean value, and the second objective function is an objective function for use to search for the deviation value identified with the acquired first model so as to minimize the deviation value.

7. The non-transitory computer-readable storage medium according to claim 1, wherein the first objective function is an objective function for use to search for the mean value identified with the acquired first model so as to maximize the mean value, and the second objective function is an objective function for use to search for the deviation value identified with the acquired first model so as to maximize the deviation value.

8. The non-transitory computer-readable storage medium according to claim 1, wherein the target object is a mixture, the constituent values are a composition ratio of materials for forming the mixture, the experiment on the target object includes a process of generating the mixture by heating, the environmental value in the experiment on the target object is a temperature of heating in the process, the allowable condition for the experiment on the target object is a melting point of the mixture, and the penalty term acts to degrade a value of an objective variable in a case where the temperature exceeds the melting point as compared with a case where the temperature is equal to or lower than the melting point.

9. The non-transitory computer-readable storage medium according to claim 3, wherein the first objective function is an objective function for use to search for an upper limit value of a confidence interval based on the mean value identified with the acquired first model so as to maximize the upper limit value of the confidence interval, and the selecting includes selecting one solution that maximizes the upper limit value of the confidence interval from the generated solution set.

10. An information processing method for a computer to execute a process comprising:

acquiring a first model trained using a first training data group to predict, from a combination of (i) constituent values of a target object and (ii) an environmental value in an experiment on the target object, a mean value of a characteristic value of the target object and a deviation value of the characteristic value, the first training data group including first training data pieces, each piece of the first training data pieces including a characteristic value of a respective first target object and a respective first combination of (i) constituent values of the respective first target object and (ii) a first environmental value in an experiment on the respective first target object;

acquiring a second model trained using a second training data group to predict an allowable condition for the experiment on the target object from the constituent values of the target object, the second training data group including second training pieces, each of the second training pieces including (i) constituent values of a respective second target and (ii) an allowable condition for an experiment on the respective second target; and generating a solution set of the combination of the constituent values and the environmental value for the target object by performing multi-objective optimization using (i) a penalty term based on the allowable condition identified by the acquired second model, (ii) a first objective function for searching for a value of a first objective variable based on the mean value identified by the acquired first model, and (iii) a second objective function for searching for a value of a second objective variable based on the deviation value identified by the acquired first model.

11. The information processing method according to claim 10, wherein the generating includes performing multi-objective optimization by use of the first objective function that contains the penalty term, and the second objective function that contains the penalty term.

12. The information processing method according to claim 10, wherein the process further includes:

selecting one solution from the generated solution set; and generating a solution for a combination of the constituent values and a second environmental value same as a third environmental value included in the selected solution by performing optimization by use of a third objective function that contains the penalty term and that is for use to search for a value of a third objective variable based on distances from the respective first combination in the first training data group to a solution candidate that contains the second environmental value.

13. The information processing method according to claim 12, wherein the generating of the solution further includes:

generating a solution for a combination of the constituent values and the second environmental value by performing optimization by use of a fourth objective function that contains the penalty term and that is for use to search for a value of a fourth objective variable based on distances from a combination specified by the generated solution to a solution candidate that contains the second environmental value.

14. The information processing method according to claim 10, wherein the first objective function is an objective function for use to search for an upper limit value of a confidence interval based on the mean value identified with the acquired first model so as to maximize the upper limit value of the confidence interval, and the second objective function is an objective function for use to search for the deviation value identified with the acquired first model so as to minimize the deviation value.

15. The information processing method according to claim 10, wherein the first objective function is an objective function for use to search for the mean value identified with the acquired first model so as to maximize the mean value, and the second objective function is an objective function for use to search for the deviation value identified with the acquired first model so as to minimize the deviation value.

16. The information processing method according to claim 10, wherein the first objective function is an objective function for use to search for the mean value identified with the acquired first model so as to maximize the mean value, and the second objective function is an objective function for use to search for the deviation value identified with the acquired first model so as to maximize the deviation value.

17. The information processing method according to claim 10, wherein the target object is a mixture, the constituent values are a composition ratio of materials for forming the mixture, the experiment on the target object includes a process of generating the mixture by heating, the environmental value in the experiment on the target object is a temperature of heating in the process, the allowable condition for the experiment on the target object is a melting point of the mixture, and the penalty term acts to degrade a value of an objective variable in a case where the temperature exceeds the melting point as compared with a case where the temperature is equal to or lower than the melting point.

18. The information processing method according to claim 12, wherein the first objective function is an objective function for use to search for an upper limit value of a confidence interval based on the mean value identified with the acquired first model so as to maximize the upper limit value of the confidence interval, and the selecting includes selecting one solution that maximizes the upper limit value of the confidence interval from the generated solution set.

19. An information processing apparatus comprising:

one or more memories; and one or more processors coupled to the one or more memories and the one or more processors configured to:

acquire a first model trained using a first training data group to predict, from a combination of (i) constituent values of a target object and an environmental value in an experiment on the target object, a mean value of a characteristic value of the target object and a deviation value of the characteristic value, the first training data group including first training data pieces, each piece of the first training data pieces including a characteristic value of a respective first target object and a respective first combination of (i) constituent values of the respective first target object and (ii) a first environmental value in an experiment on the respective first target object;

acquire a second model trained using a second training data group to predict an allowable condition for the experiment on the target object from the constituent values of the target object, the second training data group including second training pieces, each of the second training pieces including (i) constituent values of a respective second target and (ii) an allowable condition for an experiment on the respective second target; and generate a solution set of the combination of the constituent values and the environmental value for the target object by performing multi-objective optimization using (i) a penalty term based on the allowable condition identified by the acquired second model, (ii) a first objective function for searching for a value of a first objective variable based on the mean value identified by the acquired first model, and (iii) a second objective function for searching for a value of a second objective variable based on the deviation value identified by the acquired first model.

* * * * *